(12) United States Patent
Sasaki et al.

(10) Patent No.: US 11,917,319 B2
(45) Date of Patent: Feb. 27, 2024

(54) TOOL SYSTEM, TOOL MANAGEMENT METHOD, AND PROGRAM

(71) Applicant: Panasonic Intellectual Property Management Co., Ltd., Osaka (JP)

(72) Inventors: Ryosuke Sasaki, Osaka (JP); Masanori Kurita, Osaka (JP); Kouji Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 17/773,397

(22) PCT Filed: Oct. 14, 2020

(86) PCT No.: PCT/JP2020/038740
§ 371 (c)(1),
(2) Date: Apr. 29, 2022

(87) PCT Pub. No.: WO2021/090652
PCT Pub. Date: May 14, 2021

(65) Prior Publication Data
US 2022/0377256 A1    Nov. 24, 2022

(30) Foreign Application Priority Data

Nov. 6, 2019    (JP) .................................. 2019-201821

(51) Int. Cl.
*H04N 5/262*        (2006.01)
*G06V 20/50*        (2022.01)
(Continued)

(52) U.S. Cl.
CPC .............. *H04N 5/2628* (2013.01); *B25F 5/00* (2013.01); *G06V 20/50* (2022.01); *H04N 23/80* (2023.01);
(Continued)

(58) Field of Classification Search
CPC ........ H04N 5/2628; H04N 23/80; B25F 5/00; G06V 20/50; G06V 2201/07;
(Continued)

(56) References Cited

U.S. PATENT DOCUMENTS

2008/0319570 A1* 12/2008 Van Schoiack ......... B25B 21/00
                                                                700/110
2011/0082576 A1*  4/2011 Gamboa ................. B25F 5/021
                                                                 700/95

(Continued)

FOREIGN PATENT DOCUMENTS

EP    2916189 A1    9/2015
EP    3178064 A1    6/2017
(Continued)

OTHER PUBLICATIONS

International Search Report dated Dec. 15, 2020 issued in International Patent Application No. PCT/JP2020/038740, with English translation.

(Continued)

*Primary Examiner* — Albert H Cutler
(74) *Attorney, Agent, or Firm* — McDermott Will & Emery LLP

(57) ABSTRACT

A tool system includes a portable tool, an image capturing unit, an orientation detection unit, and a processing unit. The tool includes a driving unit to be activated with power supplied from a power source. The image capturing unit is provided for the tool and generates a captured image. The orientation detection unit is provided for the tool and detects an orientation of the tool. The processing unit performs processing based on the captured image and the orientation.

10 Claims, 8 Drawing Sheets

(51) Int. Cl.
   *B25F 5/00*        (2006.01)
   *H04N 23/80*       (2023.01)
   *B25B 23/147*      (2006.01)

(52) U.S. Cl.
   CPC ...... *B25B 23/1475* (2013.01); *G06V 2201/07* (2022.01)

(58) Field of Classification Search
   CPC ..... B25B 23/1475; B25B 21/02; B25B 23/14; B25B 23/147; G06T 2207/10016; G06T 5/006; G06T 7/74; G06T 1/0014; G06T 7/001; G06T 2207/30164
   See application file for complete search history.

(56) References Cited

U.S. PATENT DOCUMENTS

| | | | |
|---|---|---|---|
| 2017/0197302 | A1 | 7/2017 | Kobayashi |
| 2018/0089535 | A1* | 3/2018 | Ishiyama ............... G06V 10/25 |
| 2018/0096531 | A1* | 4/2018 | Greenhalgh ........ H04L 63/0861 |
| 2019/0294138 | A1 | 9/2019 | Dobashi et al. |
| 2021/0146513 | A1* | 5/2021 | Banzola ............... G06K 7/1417 |
| 2022/0022948 | A1 | 1/2022 | Fujii et al. |

FOREIGN PATENT DOCUMENTS

| | | | |
|---|---|---|---|
| JP | 2010-224749 | A | 10/2010 |
| JP | 2012-020353 | A | 2/2012 |
| JP | 2012-115941 | A | 6/2012 |
| JP | 2017-074632 | A | 4/2017 |
| JP | 2018-108633 | A | 7/2018 |
| JP | 2019-076980 | A | 5/2019 |
| JP | 2019-086827 | A | 6/2019 |
| JP | 2019-144965 | A | 8/2019 |
| JP | 2019-188599 | A | 10/2019 |
| WO | 2018/123433 | A1 | 7/2018 |
| WO | 2019/087638 | A1 | 5/2019 |
| WO | 2020/223100 | A1 | 11/2020 |

OTHER PUBLICATIONS

International Search Report dated Dec. 28, 2020 issued in International Patent Application No. PCT/JP2020/038739, with English translation.
International Search Report dated Dec. 28, 2020 issued in International Patent Application No. PCT/JP2020/038737, with English translation.
Extended European Search Report dated Nov. 16, 2022 issued in European Patent Application No. 20884652.7.
Extended European Search Report dated Nov. 22, 2022 issued in European Patent Application No. 20885291.3.
Third Party Observations dated Jul. 6, 2023 issued in the corresponding European Patent Application No. 20884652.7.
Notice of Reasons for Refusal dated Sep. 12, 2023 issued in the corresponding Japanese Patent Application No. 2019-201820, with English translation.

* cited by examiner

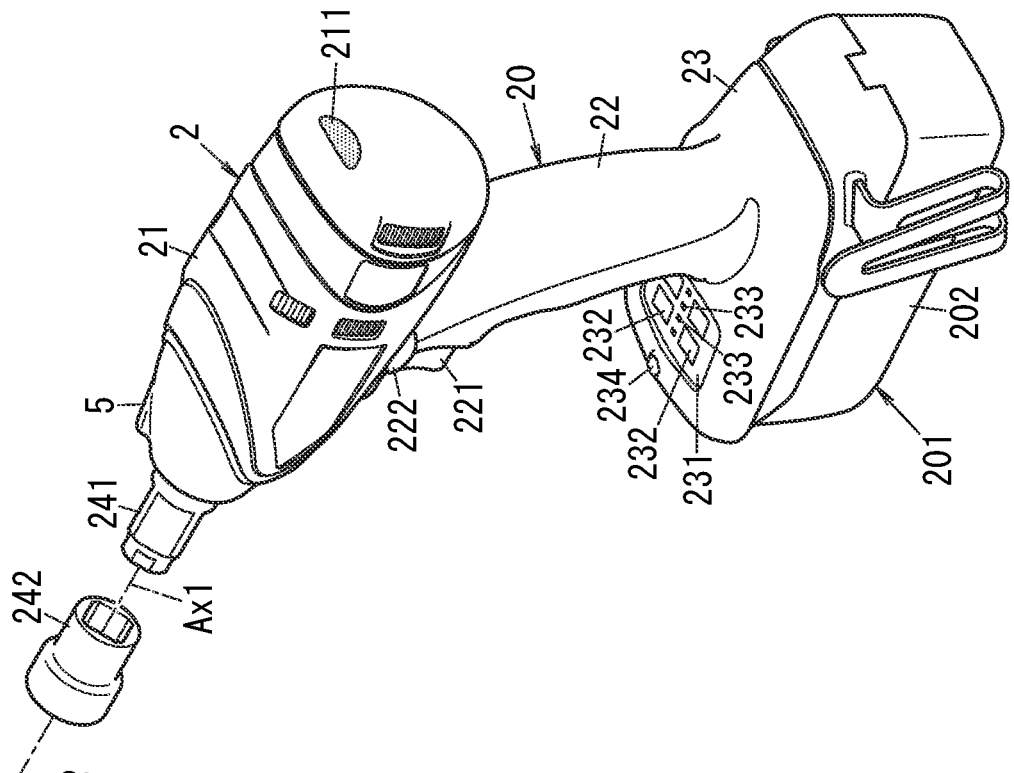
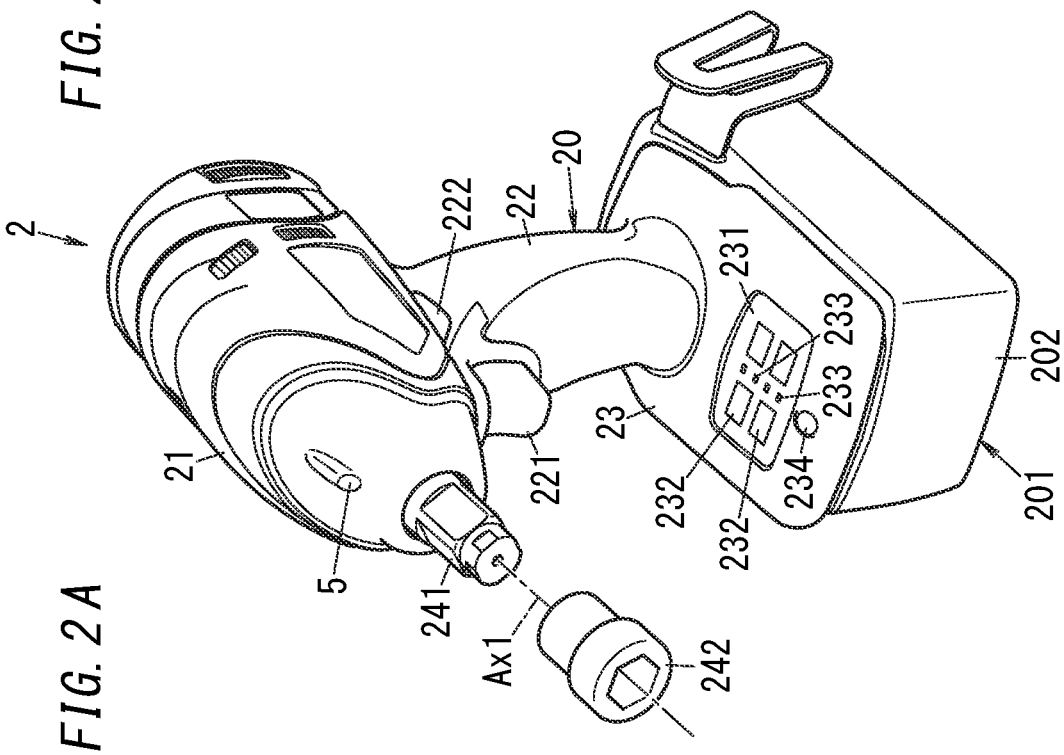

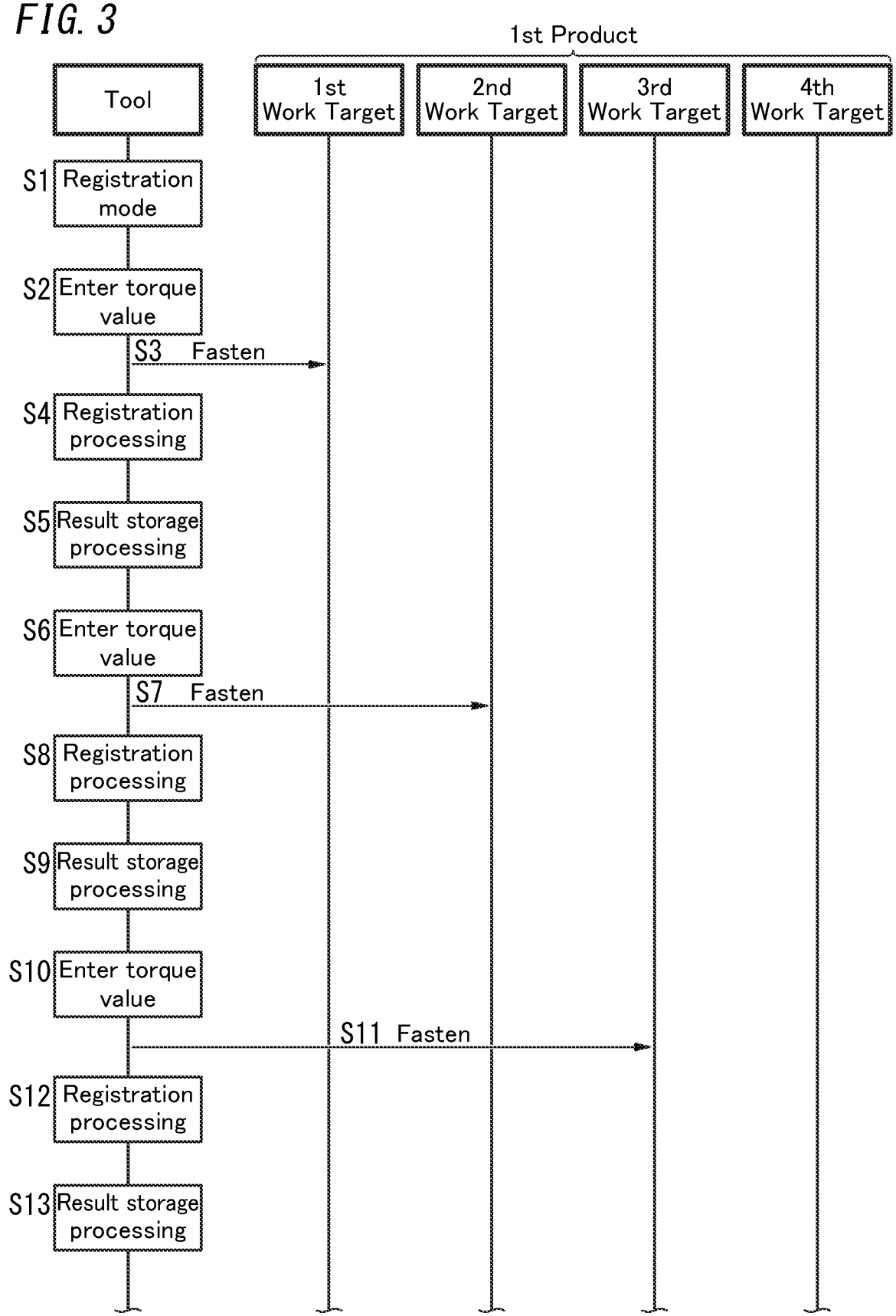

TOOL SYSTEM, TOOL MANAGEMENT METHOD, AND PROGRAM

CROSS-REFERENCE OF RELATED APPLICATIONS

This application is the U.S. National Phase under 35 U.S.C. § 371 of International Patent Application No. PCT/JP2020/038740, filed on Oct. 14, 2020, which in turn claims the benefit of Japanese Patent Application No. 2019-201821, filed on Nov. 6, 2019, the entire disclosures of which Applications are incorporated by reference herein.

TECHNICAL FIELD

The present disclosure generally relates to a tool system, a tool management method, and a program, and more particularly relates to a tool system including a portable tool, a tool management method, and a program.

BACKGROUND ART

Patent Literature 1 discloses a tool system including a portable tool having a driving unit to be activated with power supplied from a battery pack and an image capturing unit provided for the tool. The image capturing unit is arranged to cover, for example, a socket, attached to an output shaft of the tool, within its image capturing range. The image capturing unit captures an image of a work target (which may be, for example, an object or a place on which work is conducted using the tool) while the work is conducted using the tool.

According to Patent Literature 1, the image captured by the image capturing unit is used to identify the work target on which the tool is set in place (i.e., the work target that has been arranged to make the tool ready to start working on the work target). That is to say, the tool system of Patent Literature 1 includes an identification unit. The identification unit compares a captured image generated by the image capturing unit with a plurality of reference images stored in an image storage unit and identifies an actually shot work target, shot in the captured image, as the work target. In addition, according to Patent Literature 1, when finding the work target, identified by the identification unit, not conforming to a working procedure in terms of a working process step for the work target, the tool system performs processing of deactivating the driving unit, for example.

However, the tool is used in various orientations (directions). Thus, depending on the orientation of the tool, the processing that uses a captured image generated by the image capturing unit provided for the tool (e.g., identification of the work target in Patent Literature 1) may be performed with decreased reliability or accuracy.

CITATION LIST

Patent Literature

Patent Literature 1: JP 2018-108633 A

SUMMARY OF INVENTION

In view of the foregoing background, it is therefore an object of the present disclosure to provide a tool system, a tool management method, and a program, all of which are configured or designed to reduce the chances of causing a decline in the reliability or accuracy of the processing that uses a captured image generated by the image capturing unit.

A tool system according to an aspect of the present disclosure includes a portable tool, an image capturing unit, an orientation detection unit, and a processing unit. The tool includes a driving unit to be activated with power supplied from a power source. The image capturing unit is provided for the tool and generates a captured image. The orientation detection unit is provided for the tool and detects an orientation of the tool. The processing unit performs processing based on the captured image and the orientation.

A tool management method according to another aspect of the present disclosure includes a first step, a second step, and a third step. The first step includes acquiring a captured image from an image capturing unit provided for a portable tool including a driving unit to be activated with power supplied from a power source. The second step includes acquiring orientation information about an orientation of the tool from an orientation detection unit provided for the tool. The third step includes performing processing based on the captured image acquired in the first step and the orientation information acquired in the second step.

A program according to still another aspect of the present disclosure is designed to cause one or more processors to perform the tool management method described above.

BRIEF DESCRIPTION OF DRAWINGS

FIG. 2A is a perspective view illustrating the appearance, as viewed from one angle, of a tool included in the tool system;

FIG. 2B is a perspective view illustrating the appearance, as viewed from another angle, of the tool included in the tool system;

FIG. 3 shows the sequence of operations to be performed by the tool system in a registration mode;

DESCRIPTION OF EMBODIMENTS

First Embodiment (1) Overview

Figure 1:
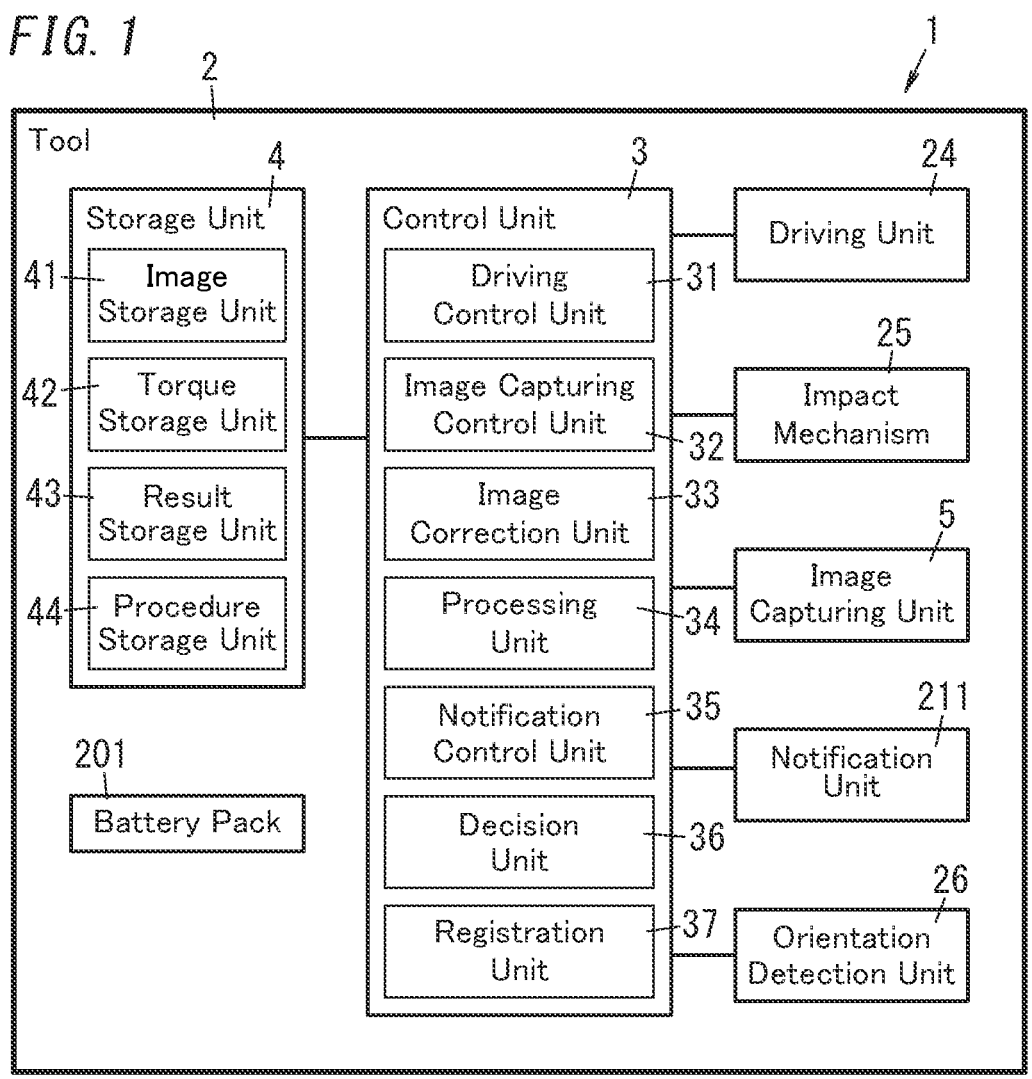
FIG. 1 is a block diagram of a tool system according to a first embodiment.

First, an overview of a tool system 1 according to an exemplary embodiment will be described with reference to FIG. 1.

A tool system 1 according to this embodiment includes a portable tool 2. The tool 2 includes a driving unit 24 including a motor, for example. The driving unit 24 is activated with motive power (such as electric power) supplied from a power source such as a battery pack 201. Examples of the tools 2 of this type include an impact wrench, a nut runner, an oil pulse wrench, a screwdriver (including an impact screwdriver), a drill, a drill-screwdriver, and various other types of tools. Using a tool 2 of this type allows the user to perform various types of machining work such as attaching a fastening member (such as a bolt or a nut) onto a workpiece (target of machining work) as a work target or opening a hole through the workpiece.

In addition, the tool system 1 according to this embodiment further includes an image capturing unit 5. The image capturing unit 5 is provided for the tool 2. The image capturing unit 5 generates a captured image. The image capturing unit 5 covers, in its image capturing range (field of view), a socket 242 (see FIG. 2A) attached to an output shaft 241 (see FIG. 2A) of the tool 2, for example. Thus, while the user is performing work using the tool 2, the image capturing unit 5 captures an image of the work target and generates a captured image.

Thus, the tool system 1 according to this embodiment allows the work target to be identified based on, for example, the captured image generated by the image capturing unit 5, thus enabling, for example, determining whether or not the work that the user is performing using the tool 2 follows the working procedure. In addition, the tool system 1 also enables determining, based on the captured image generated by the image capturing unit 5, whether the work that has been done on the work target is good or bad, notifying the user of a working instruction according to the work target, and storing the image as a log (i.e., record of work). As can be seen, using the image (captured image) generated by the image capturing unit 5 provided for the tool 2 enables, for example, supporting the user with his or her work using the tool 2 or managing his or her work.

A tool system 1 according to this embodiment includes not only the tool 2 and the image capturing unit 5 but also an orientation detection unit 26 and a processing unit 34 as shown in FIG. 1. That is to say, the tool system 1 includes the portable tool 2, the image capturing unit 5, the orientation detection unit 26, and the processing unit 34. The tool 2 includes a driving unit 24 to be activated with power supplied from a power source. The image capturing unit 5 is provided for the tool 2 and generates a captured image. The orientation detection unit 26 is provided for the tool 2 and detects an orientation of the tool 2. The processing unit 34 performs processing based on the captured image and the orientation.

According to this configuration, the processing unit 34 performs processing based on not only the captured image generated by the image capturing unit 5 provided for the tool 2 but also the orientation of the tool 2 detected by the orientation detection unit 26. This allows the tool system 1 to improve the reliability and accuracy of the processing performed by the processing unit 34, compared to a situation where the processing unit 34 performs the same processing based on only the captured image. For example, if the captured image has symmetry, it may be difficult to identify the work target based on only the captured image. In contrast, if the orientation of the tool 2 is known, the work target may be identified more easily based on the captured image, even when the captured image has symmetry. This achieves the advantage of reducing the chances of causing a decline in the reliability or accuracy of the processing that uses the captured image generated by the image capturing unit 5.

(2) Detailed Configuration

Next, a detailed configuration for the tool system 1 according to this embodiment will be described with reference to FIGS. 1-2B.

(2.1) Premise

The tool system 1 according to this embodiment may be used, for example, in an assembly line for performing assembling work on products at a factory. In particular, in this embodiment, the tool 2 included in the tool system 1 is supposed to be a fastening tool such as an impact wrench for use to tighten a fastening member (such as a bolt or a nut). Specifically, this embodiment is supposed to be applied to a situation where a single product has a plurality of portions to be fastened, thus requiring the user to attach a fastening member onto each of those portions to be fastened by using a tool 2 in a single workplace.

As used herein, the "portion to be fastened" refers to a part of a workpiece (target of machining work), to which the fastening member is attached. For example, if the fastening member is a bolt, then the portion to be fastened is an area surrounding, and covering, a screw hole to which the fastening member is attached. That is to say, in this embodiment, a single workpiece has a plurality of such portions to be fastened.

As used herein, the "work target" refers to an object (such as a workpiece) or a working area on which work is supposed to be performed by using the tool 2. In particular, a work target on which the tool 2 is set in place will be hereinafter sometimes referred to as a "current work target." As used herein, the phrase "the tool 2 is set in place" refers to a situation where the tool 2 has been placed so as to be ready to perform work on the work target. Also, as used herein, the phrase "placed so as to be ready to perform work" refers to not only a situation where the tool 2 is already in contact with the work target but also a situation where the tool 2 is on the verge of being brought into contact with the work target. That is to say, when the tool 2 is set in place on the work target, the tool 2 may be already in contact with the work target or may be still out of contact with the work target. In this embodiment, each of the plurality of portions to be fastened of a single workpiece is supposed to be the work target as an example.

As used herein, the "captured image" refers to an image captured by the image capturing unit 5 and includes a still picture (still image) and a moving picture (motion picture). The "moving picture" further includes a group of still pictures captured by stop-motion shooting, for example. The captured image does not have to be output data itself provided by the image capturing unit 5. For example, the captured image may have been subjected, as needed, to data compression, conversion into another data format, cropping an image portion from the image captured by the image capturing unit 5, focus adjustment, brightness adjustment, contrast adjustment, or any of various other types of image processing. In this embodiment, the captured image is supposed to be a full-color moving picture, for example.

Also, as used herein, if something is "provided for" something else, then the former may be built in (e.g., integrated inseparably with) the latter or may be just attached as an external member to the latter (e.g., removably secured with a coupler, for example). That is to say, the image capturing unit 5 provided for the tool 2 may be built in the tool 2 or just attached as an external member to the tool 2, whichever is appropriate.

Furthermore, as used herein, the "working procedure" means the procedure of the work to be performed using the tool 2. For example, if a series of working process steps to be performed on either a single work target or a plurality of work targets is defined to be a single working process, then the working procedure indicates the order in which the working process steps are supposed to be performed on the single work target or the plurality of work targets through the working process. More specifically, if the instruction on the work to be done on a single work target is a "working instruction," then the working procedure is information indicating either a single working instruction or a plurality of working instructions for the single working process along with the order in which the working process steps are supposed to be performed. In other words, the working procedure indicates which of the single or plurality of working processes the work target corresponds to and also indicates the place in the corresponding working process. In the following description of this embodiment, the working procedure is supposed to define in which order the work (including a plurality of working process steps) should be performed on a plurality of work targets in a single workpiece.

(2.2) Configuration for Tool

First, a configuration for a tool 2 in the tool system 1 according to this embodiment will be described with reference to FIGS. 2A and 2B.

Specifically, the tool system 1 according to this embodiment includes a portable tool 2 as described above. In this embodiment, the tool 2 is an electric tool configured to activate the driving unit 24 (see FIG. 1) by using electrical energy. In particular, in this embodiment, the tool 2 is supposed to be an impact wrench. Such a tool 2 may be used to perform fastening work of attaching a fastening member onto a work target. The tool 2 further includes an impact mechanism 25 (see FIG. 1) in addition to the driving unit 24.

In this case, the tool 2 is designed to activate the driving unit 24 with the electric power (electrical energy) supplied from a battery pack 201 by using the battery pack 201 as a power source. In this embodiment, the battery pack 201 is supposed to be counted among the constituent elements of the tool 2. However, the battery pack 201 does not have to be one of the constituent elements of the tool 2. In other words, the battery pack 201 may be counted out of the constituent elements of the tool 2.

The tool 2 further includes a body 20. In the body 20, housed are the driving unit 24 and the impact mechanism 25. In addition, the image capturing unit 5, the orientation detection unit 26, a control unit 3, a storage unit 4, and a notification unit 211 (see FIG. 1), which are included in the tool system 1 as will be described later, are also housed in the body 20. That is to say, in this embodiment, the image capturing unit 5, the orientation detection unit 26, the control unit 3, the storage unit 4, and the notification unit 211, which are constituent elements of the tool system 1, are housed in the body 20 of the tool 2 and thereby integrated with the tool 2.

The body 20 of the tool 2 includes a barrel 21, a grip 22, and an attachment member 23. The barrel 21 is formed in a cylindrical shape (e.g., circular cylindrical shape in this embodiment). The grip 22 protrudes along a normal to a part of the circumferential surface of the barrel 21 (i.e., along the radius of the barrel 21). To the attachment member 23, the battery pack 201 is attached removably. In this embodiment, the attachment member 23 is provided at the tip of the grip 22. In other words, the barrel 21 and the attachment member 23 are coupled together via the grip 22.

At least the driving unit 24 is housed in the barrel 21. The driving unit 24 includes a motor. The driving unit 24 is configured to be activated with the power supplied from the battery pack 201 as a power source to the motor. An output shaft 241 protrudes from one axial end surface of the barrel 21. The output shaft 241 turns around a rotational axis Ax1, which is aligned with the direction in which the output shaft 241 protrudes, as the driving unit 24 is activated. That is to say, the driving unit 24 drives the output shaft 241 in rotation around the rotational axis Ax1. In other words, as the driving unit 24 is activated, torque is applied to the output shaft 241, thereby causing the output shaft 241 to turn.

A cylindrical socket 242 for rotating a fastening member (such as a bolt or a nut) is attached removably onto the output shaft 241. The socket 242 turns along with the output shaft 241 around the output shaft 241. The size of the socket 242 attached to the output shaft 241 may be selected as appropriate by the user according to the size of the fastening member. According to such a configuration, activating the driving unit 24 causes the output shaft 241 to turn, thus causing the socket 242 to rotate along with the output shaft 241. If a fastening member is fitted into the socket 242 at this time, then the fastening member turns along with the socket 242, thus having the work of tightening or loosening the fastening member done. In this manner, the tool 2 may have the work of tightening or loosening the fastening member done by activating the driving unit 24.

Optionally, a socket anvil may also be attached, instead of the socket 242, onto the output shaft 241. The socket anvil is also attached removably to the output shaft 241. This allows a bit (such as a screwdriver bit or a drill bit) to be attached to the output shaft 241 via the socket anvil.

The tool 2 includes the impact mechanism 25 as described above. The impact mechanism 25 is configured to, when (the work value of) fastening torque exceeds a predetermined level, apply impacting force in the rotational direction of the output shaft 241. This allows the tool 2 to apply greater fastening torque to the fastening member.

The grip 22 is a portion to be gripped by the user while he or she is performing the work. The grip 22 is provided with a trigger switch 221 and a forward/reverse switch 222. The trigger switch 221 is a switch for controlling the ON/OFF states of the operation performed by the driving unit 24 and allows adjusting the number of revolutions of the output shaft 241 according to how deep the trigger switch 221 is pulled. The forward/reverse switch 222 is a switch for switching the rotational direction of the output shaft 241 from the clockwise direction into the counterclockwise direction, and vice versa.

The attachment member 23 is formed in the shape of a compressed rectangular parallelepiped. The battery pack 201 is attached removably to one side, opposite from the grip 22, of the attachment member 23.

The battery pack 201 includes a case 202 made of a resin and formed in a rectangular parallelepiped shape. The case 202 houses a rechargeable battery (such as a lithium-ion battery) inside. The battery pack 201 supplies electric power to the driving unit 24, the control unit 3, the image capturing unit 5, and other constituent members.

The attachment member 23 is also provided with a control panel 231. The control panel 231 may include a plurality of press button switches 232 and a plurality of LEDs (light-emitting diodes) 233, for example. The control panel 231 allows the user to enter various types of settings for, and confirm the state of, the tool 2. That is to say, by operating the press button switches 232 of the control panel 231, the user is allowed to change the operation mode of the tool 2 or the check the remaining capacity of the battery pack 201, for example.

The attachment member 23 further includes a light-emitting unit 234. The light-emitting unit 234 includes an LED, for example. The light-emitting unit 234 emits light toward the work target while the user is performing work using the tool 2. The light-emitting unit 234 may be turned ON and OFF by operating the control panel 231. Alternatively, the light-emitting unit 234 may also be lit automatically when the trigger switch 221 turns ON.

(2.3) Overall Configuration for Tool System

Next, an overall configuration for the tool system 1 according to this embodiment will be described with reference to FIG. 1.

As described above, the tool system 1 includes the portable tool 2, the image capturing unit 5, the orientation detection unit 26, and the control unit 3 (including the processing unit 34). Also, in this embodiment, the tool system 1 further includes the storage unit 4 and the notification unit 211 in addition to the tool 2 (including the battery pack 201), the image capturing unit 5, the orientation detection unit 26, and the control unit 3. Note that the storage unit 4 and the notification unit 211 are not essential constituent elements for the tool system 1 but at least one of the storage unit 4 or the notification unit 211 may be omitted as appropriate.

The image capturing unit 5, the orientation detection unit 26, the control unit 3, the storage unit 4, and the notification unit 211 are housed in the body 20 (see FIG. 2A) of the tool 2. In this embodiment, the image capturing unit 5 and the notification unit 211 may be housed in the barrel 21, for example. The orientation detection unit 26, the control unit 3 and the storage unit 4 may be housed in either the grip 22 or the attachment member 23.

The image capturing unit 5 is provided for the tool 2 and generates data as a captured image. The image capturing unit 5 may be implemented as a camera including an image sensor and a lens, for example. In this embodiment, the image capturing unit 5 may be housed in (the barrel 21 of) the body 20 of the tool 2 and thereby provided for the tool 2 integrally with the tool 2. The image capturing unit 5 is provided to be oriented toward the tip of the output shaft 241 to capture an image of the work target while the user is performing the work using the tool 2.

Specifically, the image capturing unit 5 is provided in a tip portion of the barrel 21 to be oriented toward the tip of the output shaft 241 (i.e., the socket 242) such that the socket 242 attached to the output shaft 241 falls within the image capturing range (see FIGS. 2A and 2B). The optical axis of the image capturing unit 5 is arranged to be aligned with the rotational axis Ax1 of the output shaft 241. In this embodiment, the image capturing unit 5 is arranged such that the optical axis thereof is located within a predetermined range from the rotational axis Ax1 of the output shaft 241 and that the rotational axis Ax1 and the optical axis are substantially parallel to each other. Also, the image capturing unit 5 is configured to capture images continuously while the control unit 3 is activated and generate a time series of captured images in the form of a moving picture and output the moving picture to a processing unit 34 of the control unit 3.

The orientation detection unit 26 is provided for the tool 2 and detects the orientation of the tool 2. The orientation detection unit 26 may include, for example, sensors such as an acceleration sensor and a gyrosensor. In this embodiment, the orientation detection unit 26 is provided for the tool 2 to be housed in the (grip 22 or attachment member 23 of the) body 20 of the tool 2 and thereby integrated with the tool 2. In this embodiment, the orientation detection unit 26 includes, for example, a triaxial acceleration sensor and a triaxial gyrosensor. The triaxial acceleration sensor detects acceleration in each of three axes that are perpendicular to each other and outputs an electrical signal representing the acceleration thus detected. The triaxial gyrosensor detects an angular velocity around each of three axes that are perpendicular to each other and outputs an electrical signal representing the angular velocity thus detected.

The orientation detection unit 26 may detect the gravitational direction based on, for example, the output of the acceleration sensor and detect, for example, the orientation of the tool 2 by reference to the gravitational direction. In addition, the orientation detection unit 26 may also detect, based on the output of the gyrosensor, the angular velocity of the tool 2 that is moving while rotating and further detect, based on the integral result of the angular velocity, the rotational angle of the tool 2, for example. For instance, the orientation detection unit 26 may detect such an orientation of the tool 2 that makes the direction in which the grip 22 protrudes from the barrel 21 downward (corresponding to the gravitational direction) and such an orientation of the tool 2 that makes the direction in which the grip 22 protrudes from the barrel 21 upward distinguishably from each other. The orientation detection unit 26 detects the orientation of the tool 2 based on the outputs of the sensors (including the acceleration sensor and the gyrosensor) and provides the results of detection as orientation information about the orientation of the tool 2 to the image correction unit 33 of the control unit 3 as needed.

The notification unit 211 may be implemented as an LED, for example. The notification unit 211 may be provided for the other end, opposite from the output shaft 241, of the barrel 21 of the body 20 so as to be easily viewed by the user during the work (see FIG. 2B).

The control unit 3 may include, as a major constituent element thereof, a microcontroller including one or more processors and one or more memories, for example. The microcontroller performs the function of the control unit 3 by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause one or more processors to function as the control unit 3.

The control unit 3 performs the functions of a driving control unit 31, an image capturing control unit 32, the image correction unit 33, the processing unit 34, a notification control unit 35, a decision unit 36, and a registration unit 37, for example. Note that if no operating command is entered into the trigger switch 221 or the control panel 231 (see FIG. 2A) for a certain period of time, the control unit 3 enters a sleep mode. The control unit 3 is activated when any operating command is entered, during the sleep mode, into either the trigger switch 221 or the control panel 231.

The driving control unit 31 controls the driving unit 24. Specifically, the driving control unit 31 activates the driving unit 24 to make the output shaft 241 turn at the rotational velocity determined by the press depth of the trigger switch 221 and in the rotational direction set by the forward/reverse switch 222 (see FIG. 2A).

The driving control unit 31 also controls the driving unit 24 such that the fastening torque becomes equal to a torque setting (working setting). The driving control unit 31 has a torque estimating function of estimating the magnitude of the fastening torque. In this embodiment, the driving control unit 31 estimates, until the estimated value of the fastening torque reaches a seating determination level, the magnitude of the fastening torque based on the number of revolutions or any other parameter of the driving unit 24 (motor). When the estimated value of the fastening torque reaches the seating determination level, the driving control unit 31 estimates the magnitude of the fastening torque based on the number of strokes by the impact mechanism 25. When finding the number of stokes by the impact mechanism 25 has reached a threshold number of times based on the torque setting, the driving control unit 31 determines that the fastening torque should have reached a torque setting, and stops running the driving unit 24 (i.e., the motor). This allows the tool 2 to fasten the fastening member with a fastening torque that exactly matches the torque setting. The "torque setting" will be described in detail later.

The image capturing control unit 32 controls the image capturing unit 5. The image capturing control unit 32 controls the image capturing unit 5 to make the image capturing unit 5 capture an image of the work target at least during the work using the tool 2. In this manner, the image capturing control unit 32 makes the image capturing unit 5 capture an image of the work target at least during the work using the tool 2.

The image correction unit 33 makes correction to the captured image according to the orientation of the tool 2. The orientation of the tool 2 is detected by the orientation detection unit 26 and orientation information about the orientation of the tool 2 is provided to the image correction unit 33 as needed. That is to say, the image correction unit 33 has the capability of correcting the captured image generated by the image capturing unit 5 provided for the tool 2 according to the orientation of the tool 2 when the captured image is generated. In this case, the image correction unit 33 performs various types of correction on the captured image by image processing.

In this embodiment, the image correction unit 33 performs at least spin compensation on the captured image according to the orientation. That is to say, the image correction unit 33 may make correction (spin compensation) to the captured image by rotating the captured image to arbitrary degrees. For example, the image correction unit 33 may obtain a vertically inverted captured image by rotating the captured image 180 degrees. In addition, in this embodiment, the image correction unit 33 also performs at least distortion correction on the captured image according to the orientation. That is to say, the image correction unit 33 may make correction (distortion correction) to the captured image by partially expanding or shrinking the captured image to an arbitrary degree. For example, the image correction unit 33 may obtain a captured image in which a rectangular subject is shot in a rectangular shape by subjecting a captured image in which the rectangular subject is shot in a trapezoidal shape to distortion correction. The image correction unit 33 selectively applies an appropriate one of these various types of correction according to the orientation detected by the orientation detection unit 26. The image correction unit 33 may perform the spin compensation and the distortion correction in combination as appropriate.

The processing unit 34 performs processing based on the captured image and the orientation. The processing unit 34 basically performs predetermined processing based on the captured image. In addition, in this embodiment, the processing unit 34 performs the predetermined processing with the orientation of the tool 2 detected by the orientation detection unit 26 also taken into account. This allows both the captured image and the orientation of the tool 2 to be reflected on the processing performed by the processing unit 34.

In this embodiment, the processing unit 34 performs the processing by using the captured image that has been corrected by the image correction unit 33. That is to say, the processing unit 34 performs the predetermined processing based on the captured image that has been generated by the image capturing unit 5 and corrected according to the orientation of the tool 2. Performing the processing using the captured image that has been corrected according to the orientation of the tool 2 in this manner eventually allows the processing unit 34 to perform the processing based on both the captured image and the orientation.

In this embodiment, the processing unit 34 performs the processing of identifying, as a current work target, a work target, shot on the spot in the captured image (hereinafter referred to as an "actually shot work target"), out of a plurality of work targets. That is to say, the processing unit 34 has the function of identifying the current work target, i.e., the work target on which the tool 2 is set in place. Specifically, the processing unit 34 performs, on the captured image, pattern matching processing using a plurality of reference images corresponding to the plurality of work targets as template data, thereby identifying the actually shot work target. That is to say, the processing unit 34 identifies the work target shot on the spot in the captured image by comparing the captured image with the plurality of reference images corresponding to the plurality of work targets. The processing unit 34 recognizes the work target thus identified as the current work target.

The processing unit 34 identifies the work target by performing image processing (pattern matching processing), on a frame basis, on the data output, in a moving picture format (i.e., the captured image), from the image capturing unit 5, for example. Thus, if the work target falls within the image capturing range of the image capturing unit 5, the processing unit 34 may determine which of the plurality of work targets the image capturing unit 5 is now capturing an image of (i.e., which of the plurality of work targets the actually shot work target is). The plurality of reference images are stored in the storage unit 4 (image storage unit 41).

Furthermore, if the work target thus identified does not conform to a working instruction defined by the working procedure, then the processing unit 34 performs at least one of placing a restriction on the operation of the driving unit 24 or making notification. In other words, the processing unit 34 determines whether or not the work target identified by the processing unit 34 (i.e., the actually shot work target) conforms to a working instruction defined by the preset working procedure. That is to say, the processing unit 34 determines whether or not the work target identified by the processing unit 34 agrees with the work target specified by the working instruction included in the working procedure.

Specifically, the processing unit 34 extracts data of a working procedure associated with the actually shot work target from a procedure storage unit 44 of the storage unit 4. Then, the processing unit 34 determines whether or not the work target, subjected to the current working instruction defined by the working procedure that has been extracted from the procedure storage unit 44, agrees with the work target identified as the actually shot work target. If these work targets agree with each other, the processing unit 34 decides that the work target identified should conform to the working instruction defined by the working procedure. On the other hand, if these work targets disagree with each other, the processing unit 34 decides that the work target identified should not conform to the working instruction defined by the working procedure.

When deciding, as a result of such determination, that the work target should not conform to the working instruction defined by the working procedure, the processing unit 34 performs at least one of placing a restriction on the operation of the driving unit 24 or making notification. As used herein, the "notification" includes not only notifying the user but also notifying an external terminal (such as a mobile communications device), for example.

Specifically, when deciding that the work target should not conform to the working instruction defined by the working procedure, the processing unit 34 does not allow the driving unit 24 to be activated even if the trigger switch 221 is pulled. That is to say, the driving unit 24 is allowed to be activated only when the processing unit 34 decides that the work target should conform to the working instruction defined by the working procedure. Thus, even if the tool 2 is set in place on a work target that does not conform to the working procedure, the driving unit 24 remains deactivated, thus prohibiting fastening work from being performed. This may reduce the chances of the work being performed in a wrong order. Optionally, when deciding that the work target should not conform to the working instruction defined by the working procedure, the processing unit 34 may lock the trigger switch 221 to prevent the user from pulling the trigger switch 221 in such a situation.

In addition, when deciding that the work target should not conform to the working instruction defined by the working procedure, the processing unit 34 makes the notification control unit 35 activate the notification unit 211. Thus, the notification unit 211 serves as a user notification unit for notifying the user that the tool 2 is now set in place on a work target that does not conform to the working procedure.

That is to say, the processing unit 34 performs, as predetermined processing based on the captured image and the orientation, at least target identification processing of identifying the work target. In other words, the processing unit 34 performs at least identification of the work target as (predetermined) processing. In addition, the processing unit 34 further performs, as predetermined processing based on the captured image and the orientation, procedure determination processing of comparing the work target thus identified with the working instruction defined by the working procedure and determining their correspondence. In other words, the processing unit 34 performs, as (predetermined) processing, determination of the correspondence between the work target thus identified and the working instruction defined by the working procedure. Furthermore, if the result of the procedure determination processing reveals that the work target does not conform to the working instruction, then the processing unit 34 places a restriction on the operation of the driving unit 24 and/or makes notification.

The notification control unit 35 controls the notification unit 211 provided for the tool 2. The notification control unit 35 preferably lights the notification unit 211 differently in a situation where the decision made by the processing unit 34 is disagreement (i.e., when a decision is made that the work target should not conform to the working instruction defined by the working procedure) and in a situation where the processing unit 34 has identified the actually shot work target. For example, if the decision made by the processing unit 34 is disagreement, the notification control unit 35 may light the notification unit 211 in red. On the other hand, if the processing unit 34 has identified the actually shot work target, then the notification control unit 35 light the notification unit 211 in green. This allows the user to recognize, by checking the lighting state of the notification unit 211 with the eye, whether or not the work target conforms to the working procedure. Optionally, when the trigger switch 221 is pulled in a state where the decision made by the processing unit 34 is disagreement, the notification control unit 35 may light the notification unit 211.

The decision unit 36 is configured to determine whether or not the fastening torque is a normal one when the fastening member is attached to the portion to be fastened. In this case, the decision unit 36 preferably determines, in accordance with the working instruction defined by the working procedure, whether or not the fastening torque is a normal one. Specifically, the working instruction defined by the working procedure includes a target torque value associated with the work target. This allows the decision unit 36 to determine, by comparing the target torque value included in the working instruction with the fastening torque, whether or not the work is being performed with the fastening torque specified by the working instruction.

If the driving control unit 31 has deactivated the driving unit 24 on detecting that the number of strokes by the impact mechanism 25 has reached the threshold number of times, for example, then the decision unit 36 decides that the fastening torque should be normal. On the other hand, if the driving control unit 31 has deactivated the driving unit 24 by turning the trigger switch 221 OFF before the number of strokes by the impact mechanism 25 reaches the threshold number of times, for example, then the decision unit 36 decides that the fastening torque should be insufficient (abnormal). The decision unit 36 also performs result storage processing of storing the decision results in the result storage unit 43 in association with the portion to be fastened.

In this case, the tool 2 according to this embodiment has, as its operation modes, at least a working mode and a registration mode. As used herein, the "working mode" refers to an operation mode in which the user performs some type of work using the tool 2. The registration mode refers herein to an operation mode in which a plurality of reference images are stored in the image storage unit 41 and a plurality of target torque values are stored in the torque storage unit 42. The operation mode may be switched by, for example, operating the control panel 231. Alternatively, the operation mode may also be switched by operating another member, such as a dip switch, provided separately from the control panel 231.

The registration unit 37 performs, when the operation mode of the tool 2 is the registration mode, image registration processing of making the image storage unit 41 of the storage unit 4 store the plurality of reference images and torque registration processing of making the torque storage unit 42 of the storage unit 4 store the plurality of target torque values.

The registration unit 37 makes the torque storage unit 42 store, as a target torque value during the torque registration processing, the torque setting when the fastening member is attached to the work target. Specifically, when the operation mode of the tool 2 is the registration mode, the user may enter any arbitrary torque value by operating the control panel 231, and the driving control unit 31 sets the torque value entered as the torque setting. When the fastening member is attached to the work target, the registration unit 37 makes the torque storage unit 42 store, as the target torque value, the torque setting at this time.

In addition, the registration unit 37 also makes, during the image registration processing, the image storage unit 41 store, as a reference image, the still image generated by, for example, having the image capturing unit 5 capture an image of the work target. Specifically, if the operation mode of the tool 2 is the registration mode, the trigger switch 221 also functions as a shutter release button. That is to say, when the trigger switch 221 turns ON, the image capturing unit 5 generates a still image. The registration unit 37 makes the image storage unit 41 store the still image as a reference image.

That is to say, according to this embodiment, if the operation mode of the tool 2 is the registration mode, the trigger switch 221 performs both the function as a switch for activating the driving unit 24 and the function as a shutter release button for generating the reference image. Thus, performing the fastening work when the operation mode of the tool 2 is the registration mode allows the registration unit 37 to perform the torque registration processing and the image registration processing in parallel with each other. Specifically, the registration unit 37 makes the torque storage unit 42 store, as the target torque value, a torque setting during the fastening work and also makes the image storage unit 41 store, as the reference image, a still image of the work target during the fastening work.

The storage unit 4 may be implemented as a semiconductor memory, for example, and performs the function of the image storage unit 41, the torque storage unit 42 (target value storage unit), the result storage unit 43, and the procedure storage unit 44. In this embodiment, the image storage unit 41, the torque storage unit 42, the result storage unit 43, and the procedure storage unit 44 are implemented as a single memory. However, this is only an example and should not be construed as limiting. Alternatively, these storage units 41, 42, 43, and 44 may also be implemented as four different memories. Still alternatively, the storage unit 4 may also be implemented as a storage medium such as a memory card attachable to, and removable from, the tool 2.

The image storage unit 41 stores a plurality of reference image in association with the plurality of work targets. Each reference image is a still image obtained by capturing an associated work target. Optionally, a single work target may be associated with a plurality of reference images obtained by shooting the work target from various angles or in multiple different sizes.

The torque storage unit 42 stores a plurality of target torque values (target values) in association with the plurality of work targets one to one. As used herein, the "target torque value" refers to the target value of a fastening torque when a fastening member is attached to an associated work target.

The result storage unit 43 stores the decision results obtained by the decision unit 36 with respect to a plurality of portions to be fastened in association with the plurality of work targets. It is recommended that the result storage unit 43 store the decision results obtained by the decision unit 36 with time stamps, indicating the working times, added thereto. This allows the work target decision results to be distinguished from one product to another on the assembly line.

The procedure storage unit 44 stores data about a single work procedure or a plurality of working procedures. As described above, the working procedure means the procedure in which work is supposed to be performed using the tool 2 and may be data defining in which order the work should be performed on a plurality of work targets of a single workpiece.

(3) Operation

Next, an exemplary operation of the tool system 1 according to this embodiment will be described with reference to FIGS. 3-7.

In the following example, it will be described how the tool system 1 operates when the user performs the work of assembling two products of the same type (hereinafter referred to as a "first product" and a "second product," respectively) on an assembly line. Each product is supposed to have four work targets (hereinafter referred to as "first, second, third, and fourth work targets," respectively) and the user is supposed to perform the work of attaching a fastening member onto each of these work targets using the tool 2.

(3.1) Registration Mode

First, an exemplary operation of the tool system 1 when the first product is assembled will be described with reference to FIG. 3. In this case, the tool 2 is supposed to be in an initial state in which both the image registration processing and the torque registration processing are yet to be performed by the registration unit 37. That is to say, in the tool 2 in the initial state, none of the first to fourth reference images and first to fourth target torque values corresponding to the first, second, third, and fourth work targets, respectively, are stored in the image storage unit 41 or the torque storage unit 42 yet.

The user sets the operation mode of the tool 2 as registration mode (in 51). Next, the user operates the control panel 231 to enter the torque value of the fastening torque when the fastening member is attached to the first work target (in S2). The driving control unit 31 sets the entered torque value as a torque setting for the first work target. Then, the user performs the fastening work of attaching the fastening member onto the first work target by pulling the trigger switch 221 (in S3). At this time, the first work target is shot, thus generating a still image of the first work target.

When the fastening work is done, the registration unit 37 performs registration processing (including image registration processing and torque registration processing) (in S4). Specifically, the registration unit 37 performs the image registration processing of making the image storage unit 41 store, as a first reference image associated with the first work target, a still image of the first work target generated during the fastening work in Step S3. In addition, the registration unit 37 also performs the torque registration processing of making the torque storage unit 42 store, as a first target torque value associated with the first work target, a torque setting when the fastening member is attached to the first work target during the fastening work in Step S3. That is to say, the first target torque value is associated with the first reference image.

In particular, according to this embodiment, the processing unit 34 performs the procedure determination processing. Thus, in the registration processing, the target torque value is registered to be included in the working instruction. In other words, in the registration processing, the working procedure is registered. In this example, the registration unit 37 registers the working procedure such that the working instruction instructing the work to be done on the first work target becomes the first working instruction in the working procedure. Specifically, the registration unit 37 registers, as the working process step to be performed "in the first place" according to the working procedure, a working instruction instructing the work to be done on the first work target, and this working instruction includes the first target torque value.

The decision unit 36 performs result storage processing of making the result storage unit 43 store, in association with the first work target, a first decision result indicating whether or not the fastening torque when the fastening member is attached to the first work target is a normal one (in S5).

In addition, the user sequentially performs fastening work on the second to fourth work targets in this order following the same working procedure as the first work target. Specifically, the user operates the control panel 231 to enter a torque value of fastening torque when a fastening member is attached to the second work target (in S6) and then performs the fastening work of attaching the fastening member to the second work target (in S7). At this time, a still image of the second work target is generated and the registration unit 37 performs the registration processing (including the image registration processing and the torque registration processing) (in S8). The registration unit 37 registers, as a working process step to be performed "in the second place" according to the working procedure, a working instruction instructing the work to be done on the second work target, and this working instruction includes a second target torque value. The decision unit 36 performs result storage processing of making the result storage unit 43 store a second decision result indicating whether or not the fastening torque during the fastening work in Step S7 is a normal one (in S9).

When the fastening work is done on the second work target, the user performs fastening work on the third work target. Specifically, the user operates the control panel 231 to enter a torque value of fastening torque when a fastening member is attached to the third work target (in S10) and then performs the fastening work of attaching the fastening member to the third work target (in S11). At this time, a still image of the third work target is generated and the registration unit 37 performs the registration processing (including the image registration processing and the torque registration processing) (in S12). The registration unit 37 registers, as a working process step to be performed "in the third place" according to the working procedure, a working instruction instructing the work to be done on the third work target, and this working instruction includes a third target torque value. The decision unit 36 performs result storage processing of making the result storage unit 43 store a third decision result indicating whether or not the fastening torque during the fastening work in Step S11 is a normal one (in S13).

Although not shown in FIG. 3, when the fastening work is done on the third work target, the user performs fastening work on the fourth work target. The same series of process steps as Steps S10-S13 are also performed on the fourth work target. Thus, the registration unit 37 registers, as a working process step to be performed "in the fourth place" according to the working procedure, a working instruction instructing the work to be done on the fourth work target, and this working instruction includes a fourth target torque value.

(3.2) Working Mode

When the work of assembling the first product (i.e., the fastening work on the first to fourth work targets) is finished in the registration mode, the user performs the work of assembling the second product. Next, an exemplary operation of the tool system 1 when the user performs the work of assembling the second product will be described with reference to FIG. 4.

The user operates the control panel 231 to switch the operation mode of the tool 2 from the registration mode to the working mode (in S21). Then, the user performs the work of assembling the second product with the operation mode of the tool 2 set as the working mode.

First, to attach a fastening member onto the first work target, the user sets the tool 2 in place on the first work target. At this time, the image capturing unit 5 generates a captured image of the first work target of the second product. The image correction unit 33 makes correction to the captured image of the first work target, which has been generated by the image capturing unit 5, according to the orientation of the tool 2 as detected by the orientation detection unit 26 (in S22). It will be described in detail later in the "(3.3) Image correction" section how the image correction unit 33 makes correction to the captured image.

The processing unit 34 performs, using the captured image that has been corrected by the image correction unit 33, the target identification processing of identifying the first work target to be an actually shot work target (in S23). Furthermore, the processing unit 34 performs the procedure determination processing of determining the correspondence between the first work target thus identified and the working instruction defined by the working procedure (in S24). That is to say, the processing unit 34 performs, based on the captured image generated by the image capturing unit 5 and corrected according to the orientation of the tool 2, predetermined processing (namely, the target identification processing and the procedure determination processing). Performing the processing using the captured image that has been corrected according to the orientation of the tool 2 in this manner eventually allows the processing unit 34 to perform processing based on both the captured image and the orientation.

When performing the procedure determination processing, the processing unit 34 determines whether or not the work target thus identified conforms to the working instruction defined by the working procedure, i.e., whether or not the work target conforms to the working procedure. At this time, the processing unit 34 compares the next working instruction in the working procedure that has been read out from the procedure storage unit 44 with the actually shot work target identified. In this case, the next working instruction in the working procedure, i.e., the working instruction for the working process step to be performed "in the first place," is the work to be done on the first work target. Thus, the processing unit 34 finds that both the work target identified and the work target included in the working instruction agree with the first work target.

If the decision made in the procedure determination processing indicates agreement (i.e., if the work target thus identified conforms to the working instruction defined by the working procedure), then the processing unit 34 sets a target torque value included in the working instruction as a torque setting. That is to say, if the work target identified is the first work target, then the processing unit 34 sets the first target torque value associated with the first work target as the torque setting (in S25).

More specifically, the processing unit 34 acquires, when identifying the actually shot work target, a target torque value associated with the actually shot work target from the torque storage unit 42. Then, the processing unit 34 may set the target torque value thus acquired as a torque setting. In addition, once the processing unit 34 has identified the actually shot work target, the processing unit 34 holds the target torque value associated with the actually shot work target as the torque setting until another work target is shot in the captured image. This allows, even if the processing unit 34 has become unable to identify the actually shot work target just before starting the fastening work, for example, the fastening member to be fastened at the target torque value associated with the actually shot work target.

In this state, the user performs the fastening work of attaching a fastening member onto the first work target (in S26). The decision unit 36 performs result storage processing of making the result storage unit 43 store, in association with the first work target, a first decision result indicating whether or not a fastening torque when the fastening member is attached to the first work target is a normal one (in S27).

On the other hand, if the user has failed to follow the working procedure, for example, then the decision made in the procedure determination processing may indicate disagreement, i.e., the work target identified may not conform to the working instruction defined by the working procedure. If the decision made in the procedure determination processing indicates disagreement, then the operation of the driving unit 24 is restricted (suspended) and the notification unit 211 is lit. This allows the user to notice that he or she has failed to follow the correct working procedure.

In addition, the user sequentially performs fastening work on the second to fourth work targets in this order following the same working procedure as the first work target. Specifically, to attach a fastening member onto the second work target, the user sets the tool 2 in place on the second work target. In response, the image correction unit 33 makes correction to the captured image of the second work target that has been generated by the image capturing unit 5 according to the orientation of the tool 2 that has been detected by the orientation detection unit 26 (in S28). Then, the processing unit 34 performs, using the captured image that has been corrected by the image correction unit 33, the target identification processing of identifying the second work target to be an actually shot work target (in S29). Furthermore, the processing unit 34 performs the procedure determination processing of determining the correspondence between the second work target thus identified and the working instruction defined by the working procedure (in S30). In this case, the next working instruction in the working procedure, i.e., the working instruction for the working process step to be performed "in the second place," is the work to be done on the second work target. Thus, the processing unit 34 finds that both the work target identified and the work target included in the working instruction agree with the second work target.

Thus, the processing unit 34 sets a second target torque value associated with the second work target as the torque setting (in S31). In this state, the user performs the fastening work of attaching the fastening member onto the second work target (in S32). The decision unit 36 performs result storage processing of making the result storage unit 43 store, in association with the second work target, a second decision result indicating whether or not a fastening torque when the fastening member is attached to the second work target is a normal one (in S33).

When the fastening work is done on the second work target, the user performs fastening work on the third work target. Specifically, to attach a fastening member onto the third work target, the user sets the tool 2 in place on the third work target. In response, the image correction unit 33 makes correction to the captured image of the third work target that has been generated by the image capturing unit 5 according to the orientation of the tool 2 that has been detected by the orientation detection unit 26 (in S34). Then, the processing unit 34 performs, using the captured image that has been corrected by the image correction unit 33, the target identification processing of identifying the third work target to be an actually shot work target (in S35). Furthermore, the processing unit 34 performs the procedure determination processing of determining the correspondence between the third work target thus identified and the working instruction defined by the working procedure (in S36). In this case, the next working instruction in the working procedure, i.e., the working instruction for the working process step to be performed "in the third place," is the work to be done on the third work target. Thus, the processing unit 34 finds that both the work target identified and the work target included in the working instruction agree with the third work target.

Thus, the processing unit 34 sets a third target torque value associated with the third work target as the torque setting (in S37). In this state, the user performs the fastening work of attaching the fastening member onto the third work target (in S38). The decision unit 36 performs result storage processing of making the result storage unit 43 store, in association with the third work target, a third decision result indicating whether or not a fastening torque when the fastening member is attached to the third work target is a normal one (in S39).

Figure 4:
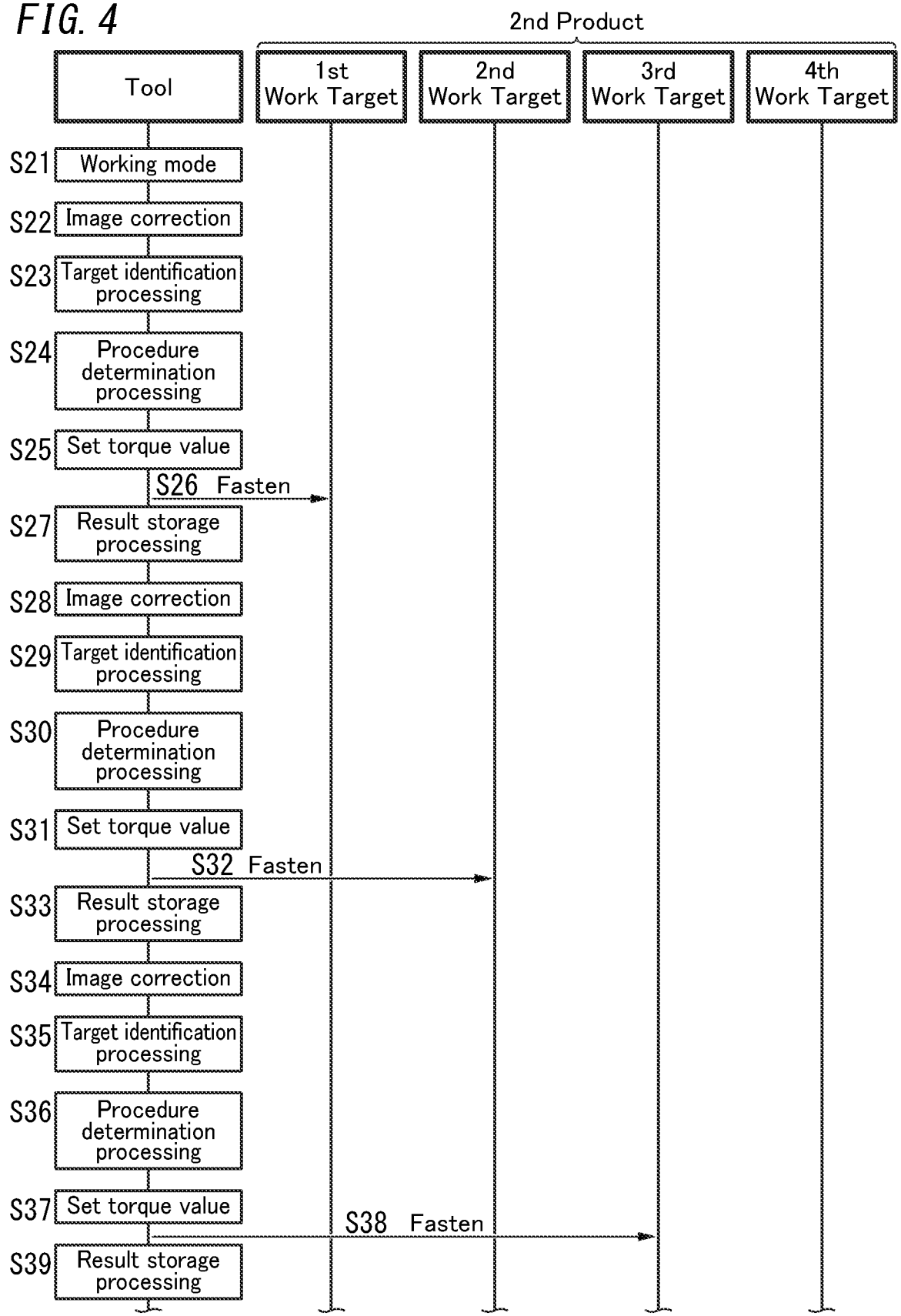
FIG. 4 shows the sequence of operations to be performed by the tool system in a working mode.

Although not shown in FIG. 4, when the fastening work is done on the third work target, the user performs fastening work on the fourth work target. The same series of process steps as Steps S34-S39 are also performed on the fourth work target. Specifically, the processing unit 34 identifies, using a captured image of the fourth work target that has been corrected according to the orientation of the tool 2, the fourth work target to be an actually shot work target, and determines the correspondence between the fourth work target thus identified and the working instruction defined by the working procedure. Then, the processing unit 34 sets a fourth target torque value associated with the fourth work target as the torque setting.

(3.3) Image Correction

Next, it will be described with reference to FIGS. 5-7 how the image correction unit 33 corrects the captured image.

In this embodiment, the image correction unit 33 corrects the captured image according to the orientation of the tool 2 that has been detected by the orientation detection unit 26 as described above.

Figure 5:
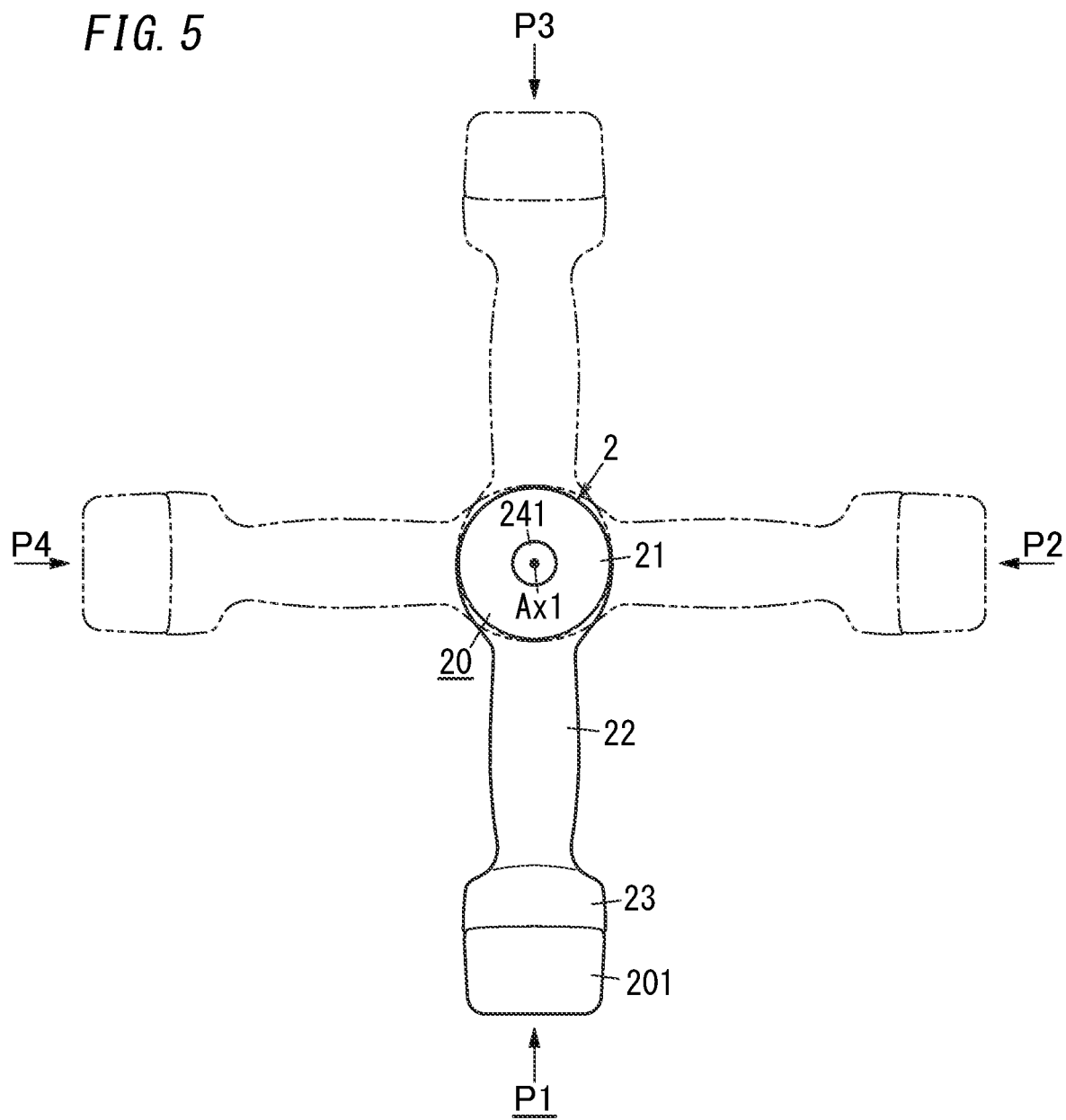
FIG. 5 is a schematic representation illustrating various orientations of the tool included in the tool system.

In this embodiment, the orientation of the tool 2 to be detected by the orientation detection unit 26 is supposed to include at least first to fourth orientations P1-P4 as shown in FIG. 5. These first to fourth orientations P1-P4 respectively correspond to four different directions, each of which is defined, in front view, by rotating the body 20 of the tool 2 by 90 degrees at every step around the rotational axis Ax1 of the output shaft 241 with a vertical plane set as the work target (i.e., with the rotational axis Ax1 aligned with the horizontal plane).

FIG. 5 schematically illustrates the appearance of the tool 2 at the respective orientations. Specifically, the first orientation P1 is an orientation of the tool 2, of which the grip 22 protrudes from the barrel 21 downward (i.e., in the gravitational direction) as indicated by the solid lines in FIG. 5. The second orientation P2 is another orientation of the tool 2, of which the grip 22 protrudes from the barrel 21 rightward (i.e., in the horizontal direction) as indicated in phantom (two-dot chains) in FIG. 5. The third orientation P3 is still another orientation of the tool 2, of which the grip 22 protrudes from the barrel 21 upward as indicated in phantom (two-dot chains) in FIG. 5. The fourth orientation P4 is yet another orientation of the tool 2, of which the grip 22 protrudes from the barrel 21 leftward (i.e., in the horizontal direction) as indicated in phantom (two-dot chains) in FIG. 5.

Figure 6A:
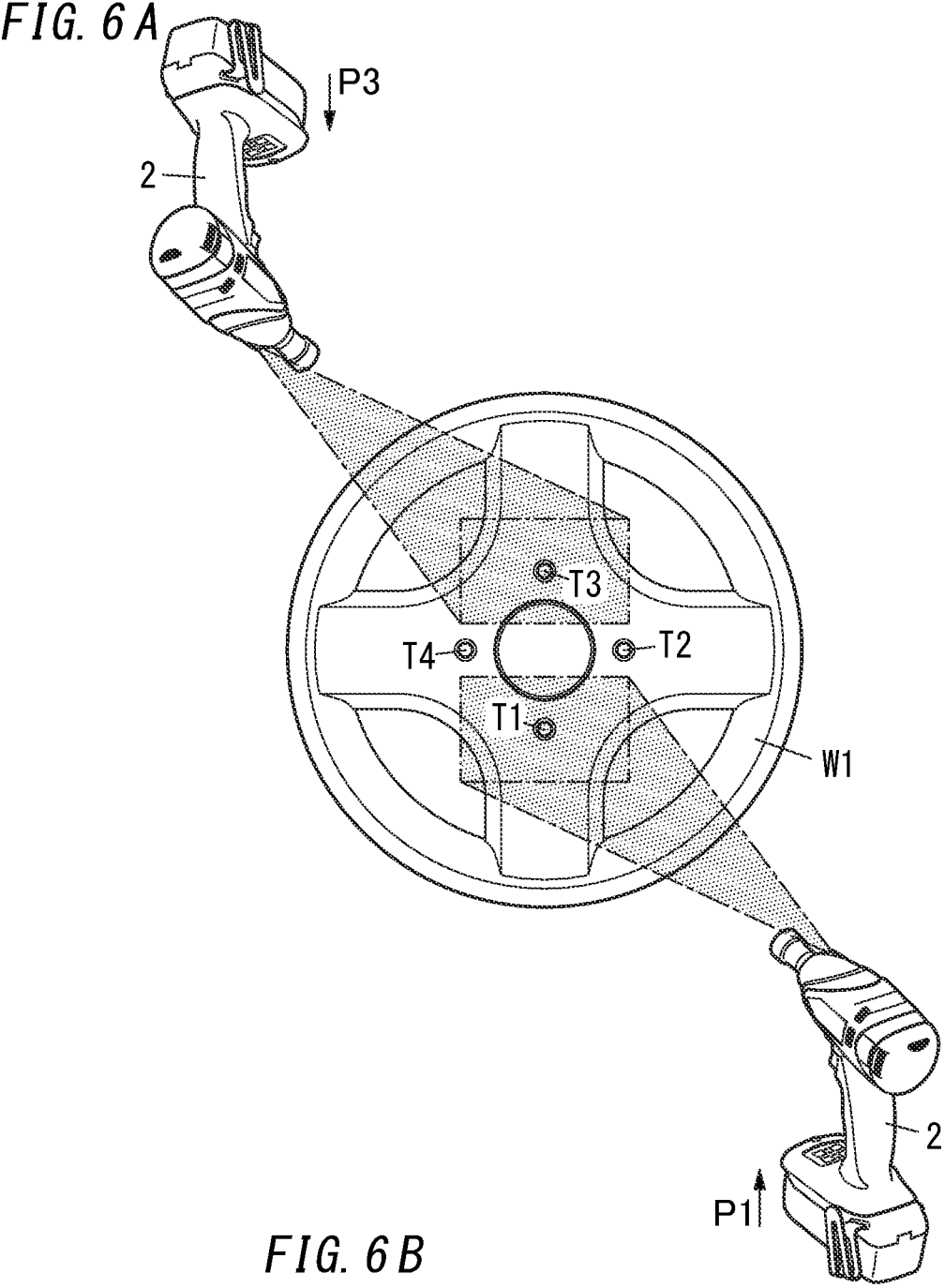
FIG. 6A is a schematic representation illustrating how the tool system captures images of work targets when its tool has a first orientation and when its tool has a third orientation, respectively.
Figure 6B:
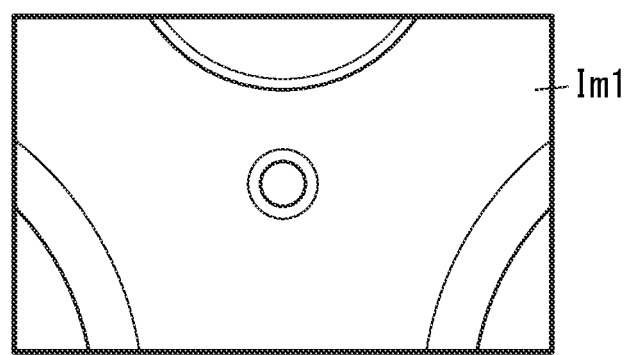
FIG. 6B is a schematic representation illustrating a captured image obtained by the tool system as shown in FIG. 6A.

Supposing the tool 2 may have any of these various orientations, if the captured image has symmetry, for example, then it may be difficult to identify the work target based on only the captured image. Suppose, for example, a situation where there are first to fourth work targets T1-T4 on a disklike workpiece W1, which is disposed along a vertical plane as shown in FIG. 6A. These work targets T1-T4 are arranged at regular intervals along the circumference of the disklike workpiece W1. In such a case, it is difficult to identify the work target based on only the captured image. For example, a captured image Im1, generated by capturing an image of the first work target T1 when the tool 2 has the first orientation P1 with the grip 22 protruding downward from the barrel 21, will be the same as a captured image Im1, generated by capturing an image of the third work target T3 when the tool 2 has the third orientation P3 with the grip 22 protruding upward from the barrel 21. That is to say, if the first work target T1 and the third work target T3 are shot when the tool 2 has the first orientation P1 and when the tool 2 has the third orientation P3, respectively, as shown in FIG. 6A, the resultant captured images Im1 will both be as shown in FIG. 6B. Thus, if the orientation of the tool 2 is unknown, it is difficult to distinguish the "first work target T1" and the "third work target T3" such as these based on only the captured images Im1.

In contrast, according to this embodiment, the orientation of the tool 2 is detected by the orientation detection unit 26, thus enabling identifying the work target even in such a case. Specifically, if the tool 2 has the first orientation P1 when the captured image Im1 shown in FIG. 6B is obtained, then the work target shot in the captured image is the "first work target T1." On the other hand, if the tool 2 has the third orientation P3 when the captured image Im1 shown in FIG. 6B is obtained, then the work target shot in the captured image is the "third work target T3." In this manner, taking the orientation of the tool 2 into account enables distinguishing the "first work target T1" and the "third work target T3" from each other based on the captured images.

Figure 7:
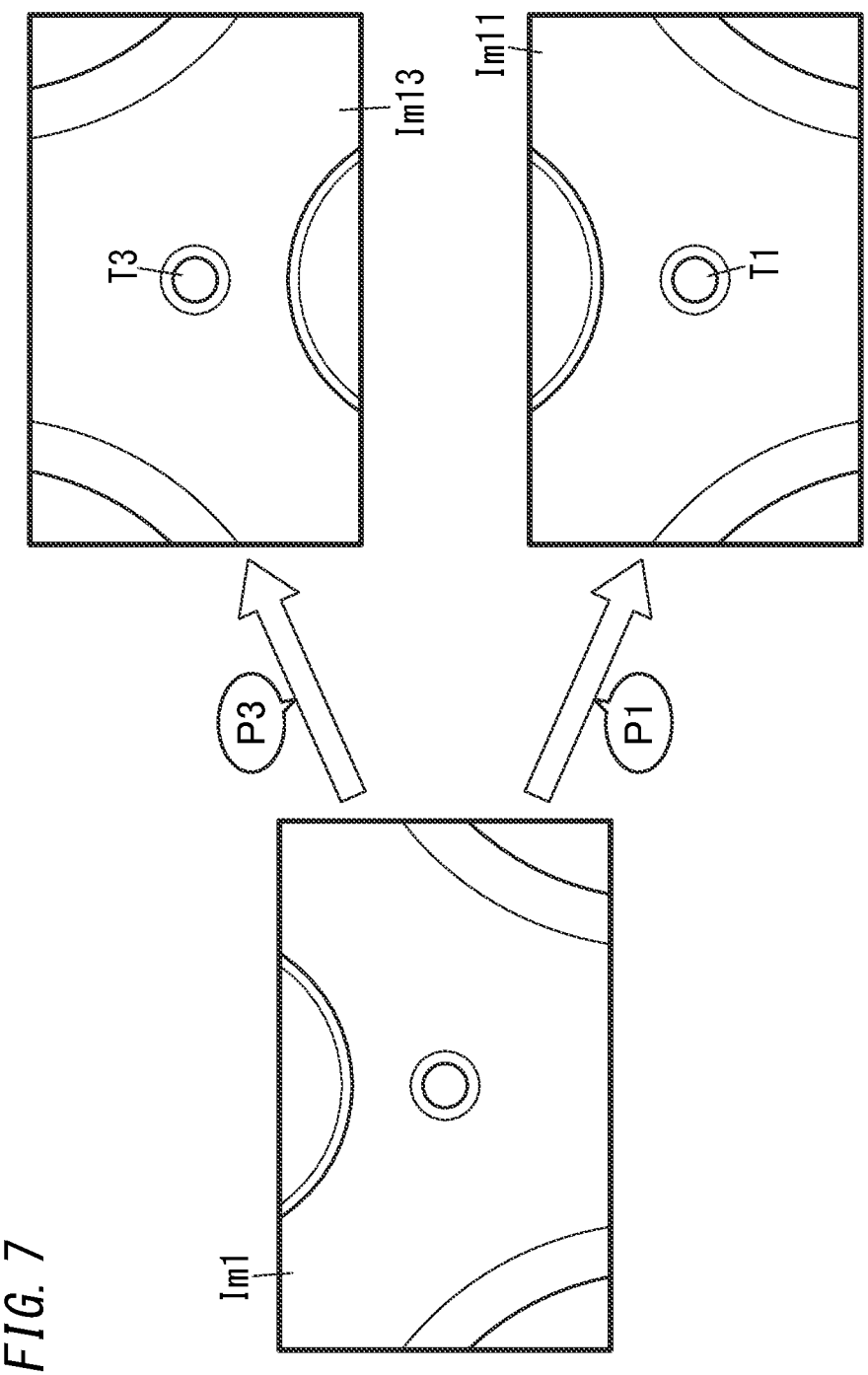
FIG. 7 conceptually illustrates how an image correction unit of the tool system makes correction to the captured image.

Thus, according to this embodiment, the image correction unit 33 makes correction to the captured image by, for example, spin compensation as shown in FIG. 7 according to the orientation of the tool 2 to be detected by the orientation detection unit 26. Specifically, as illustrated in FIG. 7, if the orientation of the tool 2 detected by the orientation detection unit 26 is the first orientation P1, then the image correction unit 33 generates a corrected captured image Im11 without rotating the captured image Im1. On the other hand, if the orientation of the tool 2 detected by the orientation detection unit 26 is the third orientation P3, then the image correction unit 33 generates a corrected captured image Im13 by rotating the captured image Im1 180 degrees. As can be seen, the work targets shot in the captured images may be distinguished from each other based on the captured images Im11, Im13 that have been corrected according to the orientation of the tool 2.

Furthermore, even though the difference in the orientation of the tool 2 is not as significant as in the example shown in FIG. 5, the captured image generated by the image capturing unit 5 may cause a subtle difference according to a slight tilt of the tool 2. Such a subtle difference in the captured image may also be compensated for by having the image correction unit 33 make correction to the captured image according to the orientation of the tool 2 to be detected by the orientation detection unit 26. For example, even when the tool 2 is used to have the same first orientation P1, the tool 2 held by the user may be slightly tilted either to the right or to the left with respect to a normal to the front surface of the work target depending on whether the user is right-handed or left-handed, thus sometimes causing a subtle difference in the captured image. Specifically, if the user who is holding the tool 2 is a left-hander that grips the tool 2 with his or her left hand, then the captured image tends to be shot from somewhat obliquely left side, compared to a right-handed user who grips the tool 2 with his or her right hand. Even in such a situation, no matter whether the captured image has been shot by a right-hander or a left-hander, the captured image shot by any of them may turn into the same image by making the image correction unit 33 correct the captured image according to the orientation of the tool 2 detected by the orientation detection unit 26.

(4) Variations

Note that the first embodiment described above is only an exemplary one of various embodiments of the present disclosure and should not be construed as limiting. Rather, the first embodiment may be readily modified in various manners depending on a design choice or any other factor without departing from the scope of the present disclosure. The drawings to be referred to in this description are all schematic representations. The ratio of the dimensions (including thicknesses) of respective constituent elements illustrated on the drawings does not always reflect their actual dimensional ratio. Also, the functions of the tool system 1 according to the first embodiment may also be implemented as a tool management method, a (computer) program, or a non-transitory storage medium that stores the program thereon. A tool management method according to an aspect includes a first step, a second step, and a third step. The first step includes acquiring a captured image from an image capturing unit 5 provided for a portable tool 2. The tool 2 includes a driving unit 24 to be activated with power supplied from a power source. The second step includes acquiring orientation information about an orientation of the tool 2 from an orientation detection unit 26. The orientation detection unit 26 is provided for the tool 2. The third step includes performing processing (see S23, S24, S29, S30, S35, and S36 shown in FIG. 4) based on the captured image Im1 acquired in the first step and the orientation information acquired in the second step. A program according to another aspect is designed to cause one or more processors to perform the tool management method described above.

Next, variations of the first embodiment will be enumerated one after another. Note that the variations to be described below may be adopted as appropriate in combination. In the following description, any constituent element, having the same function as a counterpart of the first embodiment described above, will be designated by the same reference numeral as that counterpart's, and description thereof will be omitted as appropriate herein.

The tool system 1 according to the present disclosure includes a computer system in the control unit 3 thereof, for example. The computer system may include, as principal hardware components, a processor and a memory. The functions of the tool system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the tool system 1 are integrated together in a single housing (body 20). However, this is not an essential configuration for the tool system 1. Alternatively, those constituent elements of the tool system 1 may be distributed in multiple different housings. For example, some functions of the control unit 3 may be provided in a housing provided separately from the body 20 of the tool 2. Still alternatively, at least some functions of the control unit 3, for example, may be implemented as a server or a cloud computing system as well.

Note that the tool system 1 does not have to be applied to the assembly line, on which products are assembled at a factory, but may find any other application as well.

In the first embodiment described above, the tool 2 is an impact wrench. However, the tool 2 does not have to be an impact wrench but may also be a nut runner or an oil pulse wrench, for example. Alternatively, the tool 2 may also be a screwdriver (including an impact screwdriver) for use to fasten screws (as fastening members), for example. In that case, a bit (such as a screwdriver bit) is attached to the tool 2 instead of the socket 242. Furthermore, the tool 2 does not have to be configured to be powered by the battery pack 201 but may also be configured to be powered by an AC power supply (commercial power supply). Moreover, the tool 2 does not have to be an electric tool but may also be an air tool including an air motor (driving unit) to be operated by compressed air (power) supplied from an air compressor (power source).

Also, in the first embodiment described above, the work target is supposed to be each of a plurality of portions to be fastened in a single workpiece. However, this is only an example and should not be construed as limiting. Alternatively, the work target may also be a module, part, or product with a plurality of portions to be fastened. In that case, the plurality of portions to be fastened of a single work target may have either the same target torque value or mutually different target torque values.

Also, the processing unit 34 only needs to perform processing based on the captured image and the orientation of the tool and does not have to be configured to perform identification of the work target as processing as in the first embodiment. For example, the processing unit 34 may perform the processing of outputting an image as a log (including writing image into a memory). In that case, the processing unit 34 outputs, as a log, the captured image that has been corrected by the image correction unit 33. This allows the processing unit 34 to output, as a log, an image suitable for the user to confirm or for a computer to analyze.

Alternatively, the processing unit 34 may also perform, for example, the processing of instructing the user the work to do. In that case, the processing unit 34 instructs the user the work to do based on the captured image that has been corrected by the image correction unit 33. This may improve the reliability of the working instruction given by the processing unit 34. Furthermore, the processing unit 34 may also perform the processing of determining whether the work that has been done is good or bad. In that case, the processing unit 34 determines based on the captured image corrected by the image correction unit 33, whether the work that has been done is good or bad. This may improve the accuracy of the go/no-go decision made by the processing unit 34 on the work that has been done.

In the first embodiment described above, the orientation detection unit 26 includes the acceleration sensor and the gyrosensor. However, this configuration is only an example and should not be construed as limiting. Alternatively, the orientation detection unit 26 may include only the acceleration sensor or only the gyrosensor. Furthermore, the acceleration sensor or the gyrosensor does not have to be a triaxial sensor but may also be a sensor for detecting uniaxial or biaxial acceleration or angular velocity. Optionally, the orientation detection unit 26 may include a sensor for detecting a physical quantity other than acceleration and angular velocity, either instead of, or in addition to, the acceleration sensor and the gyrosensor. The orientation detection unit 26 may use the captured image generated by the image capturing unit 5 to detect the orientation. Furthermore, the orientation detection unit 26 may also use a global navigation satellite system such as a global positioning system (GPS).

Optionally, the tool 2 may include a torque sensor for measuring the fastening torque. In that case, the driving control unit 31 controls the driving unit 24 such that the fastening torque measured by the torque sensor becomes the torque setting. Furthermore, the decision unit 36 may determine, by comparing the result of measurement by the torque sensor with the target torque value, whether or not the fastening torque is normal. When finding the result of measurement by the torque sensor falling within a predetermined range based on the target torque value, the decision unit 36 decides that the fastening torque should be a normal one. On the other hand, when finding the result of measurement by the torque sensor falling outside of the predetermined range based on the target torque value, the decision unit 36 decides that the fastening torque should be an insufficient (abnormal) one.

Note that the image registration processing does not have to be the processing of making the image storage unit 41 store, as a reference image, the still image generated by the image capturing unit 5. Alternatively, the image registration processing may also be the processing of registering, as a reference image, a still image downloaded from a server with the image storage unit 41, or the processing of registering, as a reference image, a still image acquired from an external memory such as a memory card with the image storage unit 41.

Furthermore, the notification unit 211 does not have to be a light-emitting unit such as an LED but may also be implemented as an image display device such as a liquid crystal display or an organic electroluminescent (EL) display. Optionally, the notification unit 211 may make notification (presentation) by any means other than displaying. For example, the notification unit 211 may also be implemented as a loudspeaker or a buzzer that emits a sound (including a voice). In that case, the notification control unit 35 preferably makes the notification unit 211 emit different sounds in a situation where the decision made by the processing unit 34 indicates disagreement and in a situation where the processing unit 34 has identified the actually shot work target. Still alternatively, the notification unit 211 may also be implemented as a vibrator that produces vibration or a transmitter for transmitting a notification signal to an external terminal (such as a mobile communications device) provided outside of the tool 2. Optionally, the notification unit 211 may also have, in combination, two or more functions selected from displaying, emitting a sound, producing vibration, and establishing communication.

The storage unit 4 may store working procedure data indicating a predetermined order in which working process steps are to be performed on a plurality of work targets. In that case, the processing unit 34 selects, in accordance with the working procedure, a reference image for use in image processing (pattern matching) out of the plurality of reference images. Specifically, the processing unit 34 preferentially selects one reference image, corresponding to a forthcoming work target to be processed in a forthcoming working process step, out of the plurality of reference images. As used herein, the "forthcoming work target" is a work target to be processed next to the work target that has been identified last time. The processing unit 34 performs image processing of comparing the reference image selected as template data with the captured image. That is to say, the processing unit 34 selects the reference image by predicting the work target to be shot in the captured image next time in accordance with the working procedure. This allows the processing unit 34 to identify, in a shorter time, the work target shot in the captured image.

Optionally, the processing unit 34 may also be configured to determine the type of the socket 242 attached to the tool 2 by performing image processing on the image captured by the image capturing unit 5. As used herein, the "type" is a piece of information for distinguishing different parts from each other and includes at least one piece of information about the size (dimension or length), shape, or material. In this embodiment, the processing unit 34 is configured to determine the length of the socket 242 attached to the tool 2. The processing unit 34 corrects, according to the length of the socket 242, the target torque value and sets the target torque value thus corrected as the torque setting. For example, the processing unit 34 corrects a target torque value associated with the actually shot work target by multiplying the target torque value by a coefficient corresponding to the length of the socket 242 and sets the target torque value thus corrected as the torque setting. That is to say, the processing unit 34 controls the driving unit 24 such that the fastening torque becomes equal to the corrected target torque value. This may reduce dispersion in fastening torque according to the length of the socket 242.

Alternatively, the processing unit 34 may also be configured to determine the torque setting according to the detected length (or type) of the socket 242. In the storage unit 4, stored are torque values corresponding one to one to various lengths of the socket 242. The processing unit 34 acquires, from the storage unit 4, a torque value corresponding to the determined length of the socket 242 and sets a value, based on the torque value thus acquired, as the torque setting. For example, the processing unit 34 may set the torque value, acquired from the storage unit 4, as the torque setting. This allows the fastening work to be performed at a torque value corresponding to the type of the socket 242.

Furthermore, the captured image generated by the image capturing unit 5 does not have to be a moving picture but may also be, for example, a still picture when the fastening work is done. If the captured image is a still picture, then the decision unit 36 makes the result storage unit 43 store the still picture generated by the image capturing unit 5 in association with the decision result. This allows the user to confirm the still picture of a work target, of which the fastening torque has turned out to be insufficient, for example.

The image capturing unit 5 does not have to be provided for the barrel 21 of the body 20 but may also be provided, for example, for the attachment member 23 of the body 20 or the battery pack 201. Likewise, the arrangement of the control unit 3, the storage unit 4, and other components may also be changed as appropriate.

Furthermore, in the image registration processing in the registration mode, the orientation of the tool 2 detected by the orientation detection unit 26 may also be stored, in association with the reference image generated by the image capturing unit 5, in the storage unit 4 (image storage unit 41). This allows the reference image and the orientation of the tool 2 to be registered in association with each other. Thus, in the working mode, once the captured image and the orientation of the tool 2 have been detected, the processing unit 34 may compare a reference image and the captured image that are associated with the same orientation.

Second Embodiment

Figure 8:
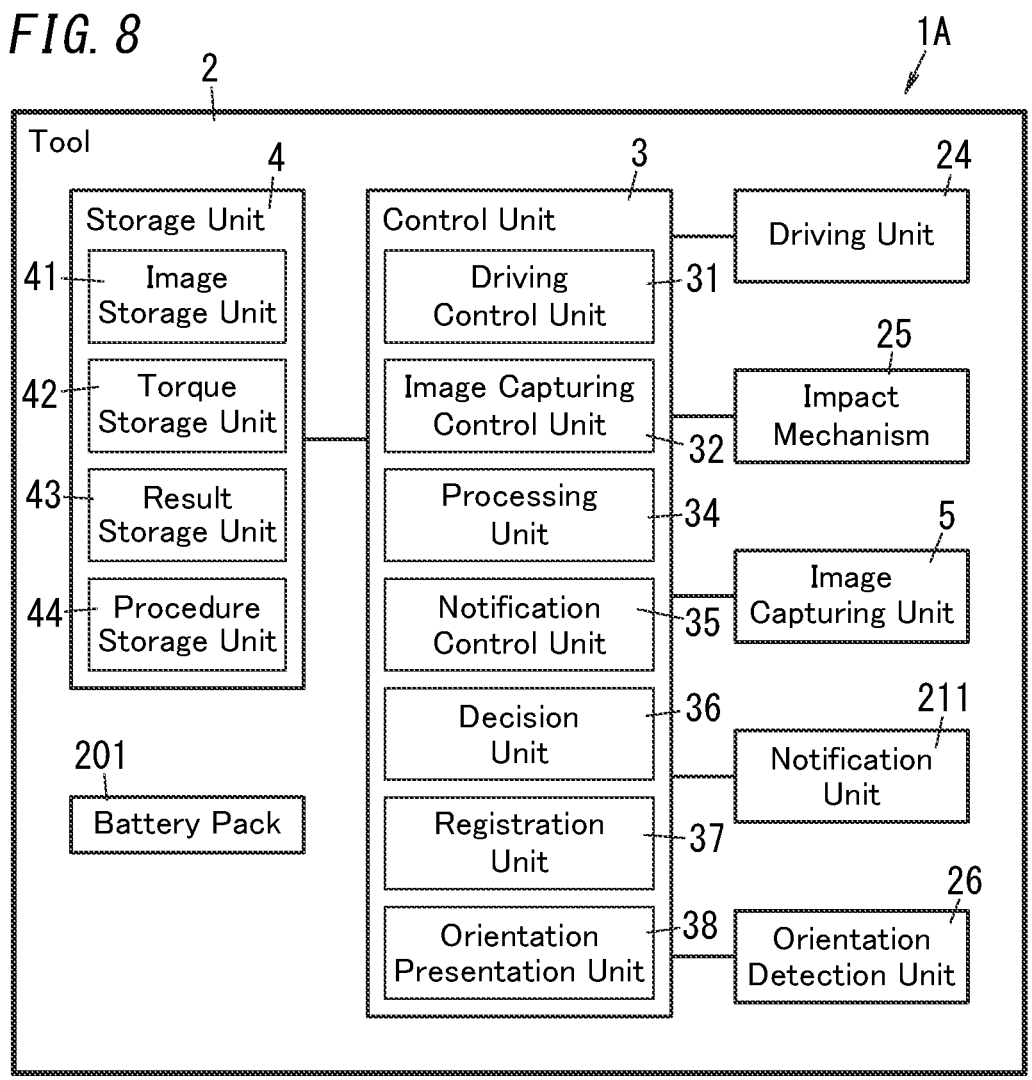
FIG. 8 is a block diagram of a tool system according to a second embodiment.

In a tool system 1A according to a second embodiment, the function of the image correction unit 33 (see FIG. 1) is omitted as shown in FIG. 8 from the control unit 3, which is a major difference from the tool system 1 according to the first embodiment. In the following description, any constituent element of this second embodiment, having the same function as a counterpart of the first embodiment described above, will be designated by the same reference numeral as that counterpart's, and description thereof will be omitted as appropriate herein.

In this embodiment, the processing unit 34 receives two pieces of input information, consisting of first information based on the captured image and second information based on the orientation, and thereby performs processing based on both the first information and the second information. That is to say, in this embodiment, the image correction unit 33 is omitted, and therefore, the captured image generated by the image capturing unit 5 (first information) and the orientation information about the orientation of the tool 2 detected by the orientation detection unit 26 (second information) are provided to the processing unit 34, not to the image correction unit 33. In this case, the captured image is generated by the image capturing unit 5 provided for the tool 2 and is supplied to the processing unit 34 when needed. Meanwhile, the orientation of the tool 2 is detected by the orientation detection unit 26 and orientation information about the orientation of the tool 2 is provided to the processing unit 34 when needed.

That is to say, the processing unit 34 receives two pieces of information that are the captured image (yet to be corrected) and the orientation information, instead of the corrected captured image that has been corrected according to the orientation of the tool 2. Then, the processing unit 34 performs predetermined processing based on these two pieces of information (i.e., the first information and the second information). Thus, in this embodiment, the processing unit 34 performs the predetermined processing by directly using the captured image and the orientation of the tool, instead of indirectly using the captured image and the orientation of the tool (i.e., using the captured image that has been corrected according to the orientation of the tool 2) as is done in the first embodiment.

The configuration of this embodiment also allows the processing unit 34 to take the orientation of the tool 2 into account. Thus, even if the captured image has symmetry, for example, the processing unit 34 may also identify the work target based on the captured image and the orientation of the tool 2. For example, suppose, in a situation where the tool system 1A has shot the first work target T1 and the third work target T3 when the tool 2 has the first orientation P1 and when the tool 2 has the third orientation P3, respectively, as shown in FIG. 6A, the same captured image Im1 has been obtained as shown in FIG. 6B. Even in such a situation, the processing unit 34 may still distinguish the "first work target T1" and the "third work target T3" from each other by determining whether the orientation of the tool 2 when the captured image Im1 is obtained is the first orientation P1 or the third orientation P3.

In addition, the tool system 1A according to this embodiment further includes an orientation presentation unit 38 as shown in FIG. 8. The orientation presentation unit 38 presents orientation information depending on the result of detection obtained by the orientation detection unit 26. In this embodiment, the orientation presentation unit 38 presents the orientation information by using the notification unit 211, for example. If the notification unit 211 is an LED, then the notification unit 211 is preferably lit in a different manner according to the orientation of the tool 2 detected by the orientation detection unit 26. For example, if the tool 2 has the first orientation P1, then the orientation presentation unit 38 may light the notification unit 211 in red. On the other hand, if the tool 2 has the third orientation P3, then the orientation presentation unit 38 may light the notification unit 211 in green.

Such an orientation presentation unit 38 may prompt the user to use the tool 2 at a particular orientation, for example, by presenting the orientation of the tool 2 to the user.

Also, in this embodiment, the processing unit 34 may receive two pieces of information, namely, the first information based on the captured image and the second information based on the orientation of the tool 2. The first information may be either the image itself captured by the image capturing unit 5 or information obtained by subjecting the captured image to an appropriate type of processing such as correction, whichever is appropriate. Likewise, the second information may be either the information itself about the orientation of the tool 2 as detected by the orientation detection unit 26 or information obtained by subjecting the information about the orientation of the tool 2 to an appropriate type of processing such as multiplying the orientation information by a predetermined coefficient, whichever is appropriate.

Note that the orientation presentation unit 38 is not an essential constituent element for the tool system 1A according to this embodiment. That is to say, the orientation presentation unit 38 may be omitted as appropriate from the configuration of the second embodiment.

The orientation presentation unit 38 is applicable as needed to the tool system 1 according to the first embodiment as well.

Optionally, the configuration described for the second embodiment (including its variations) may be adopted as appropriate in combination with the various configurations described for the first embodiment (including its variations).

(Recapitulation)

As can be seen from the foregoing description, a tool system (1, 1A) according to a first aspect includes a portable tool (2), an image capturing unit (5), an orientation detection unit (26), and a processing unit (34). The tool (2) includes a driving unit (24) to be activated with power supplied from a power source. The image capturing unit (5) is provided for the tool (2) and generates a captured image. The orientation detection unit (26) is provided for the tool (2) and detects an orientation of the tool (2). The processing unit (34) performs processing based on the captured image and the orientation.

According to this aspect, the processing unit (34) performs processing based on not only the captured image generated by the image capturing unit (5) provided for the tool (2) but also the orientation of the tool (2) detected by the orientation detection unit (26). This improves the reliability and accuracy of the processing performed by the processing unit (34) compared to a situation where the processing unit (34) performs the same processing based on only the captured image. For example, if the captured image has symmetry, it may be difficult to identify the work target based on only the captured image. In contrast, if the orientation of the tool (2) is known, the work target may be identified more easily based on the captured image, even when the captured image has symmetry. This achieves the advantage of reducing the chances of causing a decline in the reliability or accuracy of the processing that uses the captured image generated by the image capturing unit (5).

A tool system (1, 1A) according to a second aspect, which may be implemented in conjunction with the first aspect, further includes an image correction unit (33). The image correction unit (33) corrects the captured image according to the orientation. The processing unit (34) performs the processing by using the captured image corrected by the image correction unit (33).

This aspect allows the processing unit (34) to perform the processing based on the captured image and the orientation by performing the processing using the captured image that has been corrected by the image correction unit (33).

In a tool system (1, 1A) according to a third aspect, which may be implemented in conjunction with the second aspect, the image correction unit (33) performs at least spin compensation on the captured image according to the orientation.

This aspect enables a variation in the orientation due to, for example, rotation of the tool (2) to be compensated for by making correction to the captured image.

In a tool system (1, 1A) according to a fourth aspect, which may be implemented in conjunction with the second or third aspect, the image correction unit (33) performs at least distortion correction on the captured image according to the orientation.

This aspect enables a variation in the orientation due to, for example, tilt of the tool (2) to be compensated for by making correction to the captured image.

In a tool system (1, 1A) according to a fifth aspect, which may be implemented in conjunction with any one of the first to fourth aspects, the processing unit (34) receives two pieces of input information, consisting of first information based on the captured image and second information based on the orientation, and thereby performs the processing based on both the first information and the second information.

This aspect eliminates the need to perform the processing of correcting the captured image, thus contributing to speeding up the processing.

A tool system (1, 1A) according to a sixth aspect, which may be implemented in conjunction with any one of the first to fifth aspects, further includes an orientation presentation unit (38). The orientation presentation unit (38) presents orientation information based on a result of detection obtained by the orientation detection unit (26).

This aspect enables presenting, to the user, information about the orientation of the tool (2) based on the result of detection obtained by the orientation detection unit (26).

In a tool system (1, 1A) according to a seventh aspect, which may be implemented in conjunction with any one of the first to sixth aspects, the processing unit (34) performs, as the processing, at least identification of a work target.

This aspect enables identifying the work target based on the captured image and the orientation.

In a tool system (1, 1A) according to an eighth aspect, which may be implemented in conjunction with the seventh aspect, the processing unit (34) performs, as the processing, determination of correspondence between the work target identified and a working instruction defined by a working procedure.

This aspect enables determining the working procedure based on the captured image and the orientation.

In a tool system (1, 1A) according to a ninth aspect, which may be implemented in conjunction with any one of the first to eighth aspects, the orientation detection unit (26) includes at least one of an acceleration sensor or a gyrosensor.

This aspect enables detecting the orientation of the tool (2) by making the sensor detect at least one of the acceleration of the tool (2) or the angular velocity of the tool (2).

A tool management method according to a tenth aspect includes a first step, a second step, and a third step. The first step includes acquiring a captured image from an image capturing unit (5) provided for a portable tool (2) including a driving unit (24) to be activated with power supplied from a power source. The second step includes acquiring orientation information about an orientation of the tool (2) from an orientation detection unit (26) provided for the tool (2). The third step includes performing processing based on the captured image acquired in the first step and the orientation information acquired in the second step.

This aspect achieves the advantage of reducing the chances of causing a decline in the reliability or accuracy of the processing that uses the captured image generated by the image capturing unit (5).

A program according to an eleventh aspect is designed to cause one or more processors to perform the tool management method according to the tenth aspect.

This aspect achieves the advantage of reducing the chances of causing a decline in the reliability or accuracy of the processing that uses the captured image generated by the image capturing unit (5).

Note that these are not the only aspects of the present disclosure but various configurations of the tool system (1, 1A) according to the first and second embodiments (including their variations) may also be implemented as a tool management method or a program.

Note that the constituent elements according to the second to ninth aspects are not essential constituent elements for the tool system (1, 1A) but may be omitted as appropriate.

REFERENCE SIGNS LIST 1, 1A Tool System
2 Tool
5 Image Capturing Unit
24 Driving Unit
26 Orientation Detection Unit
33 Image Correction Unit
34 Processing Unit
38 Orientation Presentation Unit

The invention claimed is:

1. A tool system comprising:
a portable tool including a driving unit, the driving unit being configured to be activated with power supplied from a power source;
an image capturing unit provided for the tool and configured to generate a captured image;
an orientation detection unit provided for the tool and configured to detect an orientation of the tool; and
a processing unit configured to perform processing based on the captured image and the orientation.

2. The tool system of claim 1, further comprising an image correction unit configured to correct the captured image according to the orientation, wherein
the processing unit is configured to perform the processing by using the captured image corrected by the image correction unit.

3. The tool system of claim 2, wherein
the image correction unit is configured to perform at least spin compensation on the captured image according to the orientation.

4. The tool system of claim 2, wherein
the image correction unit is configured to perform at least distortion correction on the captured image according to the orientation.

5. The tool system of claim 1, wherein
the processing unit is configured to receive two pieces of input information that are first information based on the captured image and second information based on the orientation, and thereby perform the processing based on both the first information and the second information.

6. The tool system of claim 1, further comprising an orientation presentation unit configured to present orientation information based on a result of detection obtained by the orientation detection unit.

7. The tool system of claim 1, wherein
the processing unit is configured to perform, as the processing, at least identification of a work target.

8. The tool system of claim 7, wherein
the processing unit is configured to perform, as the processing, determination of correspondence between the work target identified and a working instruction defined by a working procedure.

9. The tool system of claim 1, wherein
the orientation detection unit includes at least one of an acceleration sensor or a gyrosensor.

10. A non-transitory storage medium storing thereon a program designed to cause one or more processors to perform the processing unit of claim 1.

* * * * *